(12) United States Patent
Murakami

(10) Patent No.: US 9,100,864 B2
(45) Date of Patent: Aug. 4, 2015

(54) OPERATION MONITORING APPARATUS, CAUSE EVENT ESTIMATING METHOD FOR THE SAME, AND INFORMATION COMMUNICATION NETWORK SYSTEM

(71) Applicant: FUJITSU LIMITED, Kawasaki-shi (JP)

(72) Inventor: Norio Murakami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 13/859,260

(22) Filed: Apr. 9, 2013

(65) Prior Publication Data

US 2013/0329562 A1 Dec. 12, 2013

(30) Foreign Application Priority Data

Jun. 7, 2012 (JP) ................. 2012-130198

(51) Int. Cl.
*H04J 1/16* (2006.01)
*H04W 24/08* (2009.01)
*H04L 12/24* (2006.01)

(52) U.S. Cl.
CPC ........... *H04W 24/08* (2013.01); *H04L 41/0631* (2013.01)

(58) Field of Classification Search
USPC ........................ 370/241, 241.1, 252, 253, 332
See application file for complete search history.

(56) References Cited

U.S. PATENT DOCUMENTS

| | | | |
|---|---|---|---|
| 2007/0118638 A1* | 5/2007 | Ban et al. ....................... | 709/224 |
| 2009/0069004 A1* | 3/2009 | Ergen et al. ................. | 455/422.1 |
| 2012/0135766 A1* | 5/2012 | Garavaglia et al. ........... | 455/509 |
| 2012/0135771 A1* | 5/2012 | Futaki ............................ | 455/509 |
| 2012/0231809 A1* | 9/2012 | Siomina et al. ............ | 455/456.1 |
| 2013/0331110 A1* | 12/2013 | Jia et al. ........................ | 455/450 |

FOREIGN PATENT DOCUMENTS

| | | |
|---|---|---|
| JP | 5-114899 | 5/1993 |
| JP | 2000-288877 | 10/2000 |
| WO | WO-00-51381 A1 | 8/2000 |
| WO | WO-02-47406 A2 | 6/2002 |
| WO | WO-2013-153026 A1 | 10/2013 |

OTHER PUBLICATIONS

Takechi, Ryuichi et al.; "Technology to Optimize Radio Access Networks: Self-Organizing Network (SON)," Fujitsu.62, 4. pp. 449-454, Jul. 2011 (English Abstract).

(Continued)

*Primary Examiner* — Phuc Tran
(74) *Attorney, Agent, or Firm* — Fujitsu Patent Center

(57) ABSTRACT

An operation monitoring apparatus for estimating a cause by which a first and second observation data observed by a monitored apparatus are obtained, the operation monitoring apparatus including: an observation event receiving process unit which receives the first and second observation data transmitted from the monitored apparatus; an observation event extracting unit which extracts the first observation data, out of the first and second observation data, based on a probability that the cause occurs with respect to the first and second observation data; a cause event determining process unit which estimates the cause based on the extracted first observation data; and a cause notifying process unit which outputs data indicating the estimated cause.

13 Claims, 32 Drawing Sheets

(56) References Cited

OTHER PUBLICATIONS

Gao, C. et al, "Host Anomalies Detection Using Logistic Regression Modeling," 2009 First International Workshop on Education Technology and Computer Science, IEEE, Mar. 7, 2009, pp. 655-659, XP03145853.

Extended European Search Report dated Dec. 10, 2013 for corresponding European Application No. 13164074.0.

* cited by examiner

SPACE IN WHICH THE OBSERVATION EVENT Y CAN ACTUALLY EXIST = BOUNDED CLOSED SPACE

SPACE IN WHICH THE OBSERVATION EVENT Y CAN EXIST (MINUS INFINITY, INFINITY)

STATE X NOT TO BE OBSERVED

OBSERVATION VALUE DISTRIBUTION

STATE DISTRIBUTION
(= CAUSE EVENT DISTRIBUTION)

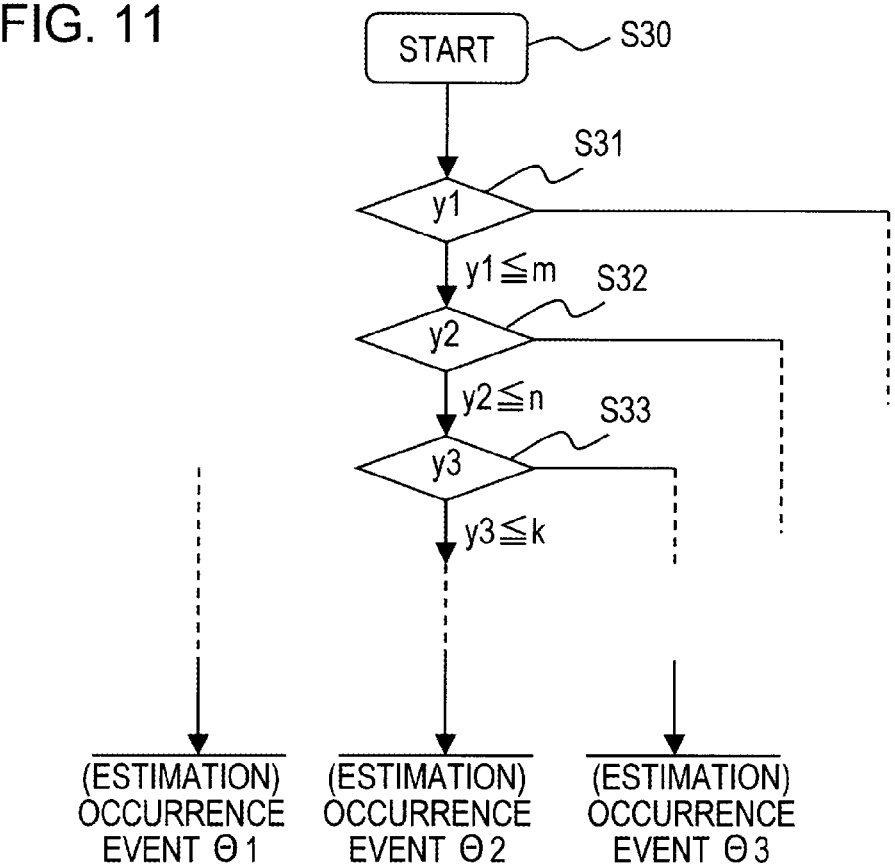

FIG. 14

| CLASSIFICATION | APPARATUSES TO BE OBSERVED, LOCATIONS, AND SO ON | | EVENT TO BE OBSERVED |
|---|---|---|---|
| QUALITY STATES | RNC/ CELL/ SECTOR/ SPECIFIC LOCATION/ SPECIFIC TIME | UP LINK | TX LEVEL INCREASE |
| | | | RX LEVEL REDUCTION |
| | | | BLER INCREASE |
| | | | SIR INCREASE |
| | | | Ec/Io INCREASE |
| | | DOWN LINK | TX LEVEL INCREASE |
| | | | RX LEVEL REDUCTION |
| | | | BLER INCREASE |
| | | | SIR INCREASE |
| | | | Ec/Io INCREASE |
| CALL CONNECTION STATES | RNC/ CELL/ SECTOR/ SPECIFIC LOCATION/ SPECIFIC TIME | AMR | LOCATION REGISTRATION IS NOT POSSIBLE |
| | | | CALL CONNECTION IS NOT POSSIBLE |
| | | | ONE-WAY CALLING |
| | | | SOUNDLESS |
| | | | NOISE IS SUBSTANTIALLY NOTICEABLE |
| | | | OCCURRENCE OF CALL DISCONNECTION |
| | | | INCOMING CALL IS NOT AVAILABLE |
| | | PS | ATTACH IS NOT POSSIBLE |
| | | | CALL CONNECTION IS NOT POSSIBLE |
| | | | THROUGHPUT IS REDUCED |
| | | | OCCURRENCE OF CALL DISCONNECTION |
| | | : | : |
| | | : | : |

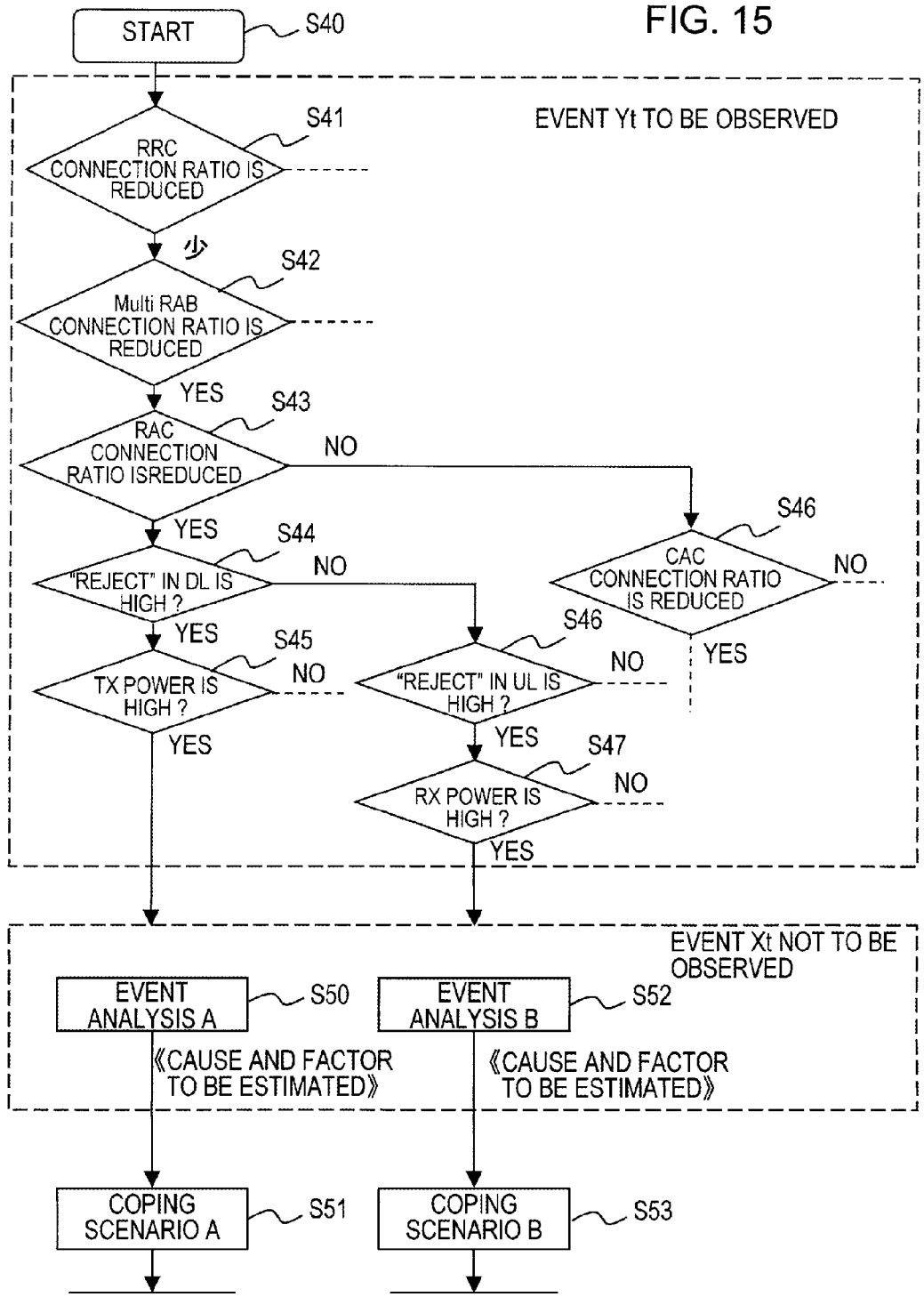

FIG. 16

| |
|---|
| THE CONNECTION SUCCESS RATIO OF RRC connection phase (THE TOTAL OF SENDING AND RECEIVING CALLS REGARDING THE ENTIRE TYPES) IS REDUCED |
| THE CONNECTION SUCCESS RATIO OF RAB establishment phase (THE TOTAL OF ENTIRE RAB) IS REDUCED |
| THE CONNECTION SUCCESS RATIO OF multi RAB (2ND RAB ONWARD) IS REDUCED |
| RRC connection reject RATIO (THE TOTAL OF SENDING AND RECEIVING CALLS REGARDING THE ENTIRE TYPES) IS HIGH |
| RRC connection setup TRANSMISSION RATIO (THE TOTAL OF SENDING AND RECEIVING CALLS REGARDING THE ENTIRE TYPES) IS LOW |
| RRC connection setup COMPLETE RATIO (THE TOTAL OF SENDING AND RECEIVING CALLS REGARDING THE ENTIRE TYPES) IS LOW |
| THE CONNECTION SUCCESS RATIO OF RAB establishment phase REGARDING CS TOTAL IS LOW |
| THE CONNECTION SUCCESS RATIO OF RAB establishment phase REGARDING PS TOTAL IS LOW |
| : |
| : |
| THE CONNECTION SUCCESS RATIO OF RRC connection phase (THE TOTAL OF SENDING AND RECEIVING CALLS REGARDING conversational) IS LOW |
| THE CONNECTION SUCCESS RATIO OF RRC connection phase (THE TOTAL OF SENDING AND RECEIVING CALLS REGARDING streaming) IS LOW |
| : |
| : |
| THE RAB CONNECTION FAILURE RATIO ACCORDING TO Radio Link reconfiguration failure with cause UR (AMR) IS HIGH |
| THE RAB CONNECTION FAILURE RATIO ACCORDING TO Radio Link reconfiguration failure with cause DL (AMR) IS HIGH |
| : |
| : |
| THE FAILURE RATIO OF RAB reject with cause of unspecific (CS) IS HIGH |
| THE FAILURE RATIO OF RAB reject with cause of resource (CS) IS HIGH |
| : |

FIG. 17

| CLASSIFICATION | CAUSAL APPARATUSES AND LOCATIONS | CAUSAL EVENTS |
|---|---|---|
| QUALITY AND CALL CONNECTION STATES | RNC/ CELL/ Sector/ SPECIFIC LOCATION/ SPECIFIC TIME | LOADS HAVE CONCENTRATED |
| | | THE NUMBER OF Attempts IS LARGE |
| | | INTERFERENCE WAVES ARE NOTICEABLE |
| | | THERE IS AN ERROR IN THE SETTING PARAMETERS |
| | | TRANSMISSION POWER IS INSUFFICIENT |
| | | RADIO RESOURCE IS INSUFFICIENT |
| | | COVERAGE HOLE OCCURS |
| | | : |
| | | : |
| | | : |
| HANDOVER | H/O TYPE (HARD/ SOFT ····) | 1a (1b) THRESHOLD VALUE IS TOO LOW OR TOO HIGH |
| | | THE NUMBER OF ACTIVE SETS IS TOO MANY |
| | | SECTOR IS UNREGISTERED IN NEVER-LIST |
| | | CELL IS UNREGISTERED IN NEVER-LIST |
| | | FREQUENCY IS UNREGISTERED IN NEVER-LIST |
| | | : |
| | | : |

FIG. 18

| SELF CELL TRAFFIC | HIGH | HIGH | HIGH | HIGH | LOW | LOW | LOW | HIGH | HIGH | HIGH | ... | ... |
|---|---|---|---|---|---|---|---|---|---|---|---|---|
| ANOTHER CELL TRAFFIC | HIGH | LOW | HIGH | HIGH | LOW | LOW | LOW | HIGH | HIGH | HIGH | ... | ... |
| Call Drop | LOW | LOW | LOW | HIGH | LOW | LOW | LOW | LOW | LOW | HIGH | ... | ... |
| ANOTHER CELL RL-F | HIGH | HIGH | HIGH | HIGH | HIGH | HIGH | HIGH | LOW | LOW | LOW | ... | ... |
| ANALYSIS RESULT NO. | 11 | 13 | 12 | 14 | 15 | 15 | 16 | 16 | 11 | 13 | 12 | |

FIG. 19A

| CONDITION | (1) | (2) | (3) | (4) | (5) | (6) |
|---|---|---|---|---|---|---|
| A: SELF CELL TRAFFIC | HIGH | HIGH | HIGH | LOW | LOW | LOW |
| B: ANOTHER CELL TRAFFIC | HIGH | MEDIUM | LOW | HIGH | MEDIUM | LOW |
| C: HO RATIO | HIGH | HIGH | HIGH | HIGH | HIGH | HIGH |

FIG. 19B

| CONDITION | (7) | (8) | (9) | (10) | (11) | (12) |
|---|---|---|---|---|---|---|
| A: SELF CELL TRAFFIC | HIGH | HIGH | HIGH | LOW | LOW | LOW |
| B: ANOTHER CELL TRAFFIC | HIGH | MEDIUM | LOW | HIGH | MEDIUM | LOW |
| C: HO RATIO | LOW | LOW | LOW | LOW | LOW | LOW |

FIG. 21

| OBSERVATION EVENT (DATA) | SELF CELL TRAFFIC = HIGH<br>ANOTHER CELL TRAFFIC = HIGH<br>Call Drop RATIO = LOW | SELF CELL TRAFFIC = HIGH<br>ANOTHER CELL TRAFFIC = HIGH<br>Call Drop RATIO = HIGH |
|---|---|---|
| EVENT OBTAINED BASED ON OBSERVATION | LOADS IN SELF AND ANOTHER CELL ARE LARGE, WHICH FAILS TO SATISFY THE QUALITY REQUIREMENTS ON UL SIDE, AND "REJECT" OCCURS | |
| EVENT TO BE ESTIMATED OR DETERMINED | ERROR IN PARAMETER SETTINGS/ HO AREA IS TOO WIDE/ EXCESSIVE RADIO WAVES ARE RECEIVED FROM ANOTHER CELL/ TX SYSTEM APPARATUS FAILURE/ OVERLOAD/ OTHER | ERROR IN PARAMETER SETTINGS/ HO AREA IS TOO WIDE/ EXCESSIVE RADIO WAVES ARE RECEIVED FROM ANOTHER CELL/ TX SYSTEM APPARATUS FAILURE/ OVERLOAD/ OTHER |
| MEASURES AND COPE OF THE OPERATOR (THE ITEM NUMBER IN THE TABLE INDICATES THE ORDER OF COPE) | 1. Admission THRESHOLD VALUE IS RAISED<br>2. CORRECTION OF CHCH Power DISTRIBUTION<br>3. RF EXTENSION<br>4. CHANGE OF TILTING ANTENNAS OF OTHER BASE STATION<br>5. SECTOR EXTENSION<br>6. BASE STATION EXTENSION<br>6. FIELD SURVEY (DRIVE TEST IN THE VICINITY OF CELL EDGE) | 1. CORRECTION OF CHCH Power DISTRIBUTION<br>2. RF EXTENSION<br>3. SELF CELL CESSATION (LOAD ALLEVIATION)<br>4. SECTOR EXTENSION<br>5. BASE STATION EXTENSION<br>6. FIELD SURVEY (DRIVE TEST IN THE VICINITY OF CELL EDGE) |

FIG. 23

| | |
|---|---|
| Call Drop RATIO INCREASE | THE TOTAL call drop RATIO OF ALL SERVICES INCREASES |
| | THE TOTAL call drop RATIO OF CS INCREASES |
| | THE TOTAL call drop RATIO OF PS INCREASES |
| | THE call drop radio link failure OF CS INCREASES |
| | THE call drop radio link failure OF PS INCREASES (DCH) |
| | THE call drop radio link failure OF PS INCREASES (FACH) |
| | THE call drop radio link failure OF CS streaming INCREASES |
| | : |
| | : |
| | THE drop OCCURS WITHOUT DEPENDING ON SERVICES |
| | DOES IT OCCUR AT S SPECIFIC RATE ? |
| | DOES IT OCCUR IN A SPECIFIC CELL ? |
| | DOES IT OCCUR CONSECUTIVELY ? |
| | DOES IT OCCUR IN A SPECIFIC UE ? |
| | : |
| | : |
| HANDOVER SUCCESS RATIO DECREASES | THE SUCCESS RATIO AT preparation phase OF HHO IS REDUCED |
| | THE SUCCESS RATIO AT execution phase OF HHO IS REDUCED |
| | THE SUCCESS RATIO OF inter frequency HHO (blind HO) IS REDUCED (THE TOTAL OF ALL SERVICES) |
| | THE SUCCESS RATIO OF inter frequency HHO (blind HO) IS REDUCED (CS streaming) |
| | : |
| | : |
| | THE SUCCESS RATIO OF radio HO TO GSM (event 3a) AT execution phase OF inter RAT HHO IS REDUCED (THE TOTAL OF ALL SERVICES) |
| | THE SUCCESS RATIO OF blind HO TO GSM (event 2d_em) AT execution phase OF inter RAT HHO IS REDUCED (CS streaming) |
| | : |
| | : |

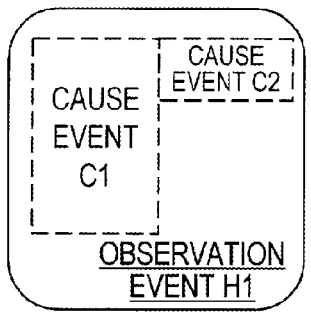 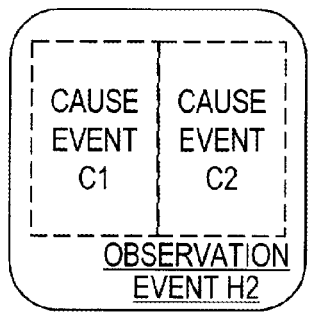 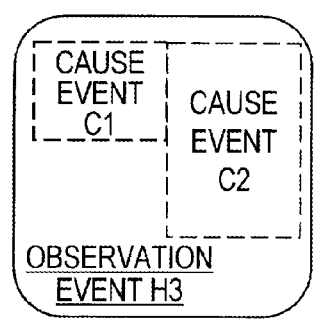
FIG. 26A  FIG. 26B  FIG. 26C
FIG. 27
| OBSERVATION EVENT | H1 | H2 | H3 |
|---|---|---|---|
| INITIAL(SETTING) CONDITION | 0.33 | 0.33 | 0.33 |
| FIRST TIME | 0.47 | 0.32 | 0.21 |
| SECOND TIME | 0.61 | 0.27 | 0.12 |
| THIRD TIME | 0.72 | 0.21 | 0.06 |
| FOURTH TIME | 0.81 | 0.16 | 0.03 |
| FIFTH TIME | 0.87 | 0.11 | 0.02 |

FIG. 30

EXTRACTION OF THE OBSERVATION DATA (TIME SERIES)

FILE(F) EDIT(E) DISPLAY(V) INQUIRY TABLE(N) CONNECTION(C) DATA MART GENERATION(M) TOOL(T) WINDOW(W) HELP(H)

| DATE | TIME | BTS NUMBER | THE NUMBER OF COMMUNICATIONS AT RATE 1 | CALL THROUGHPUT | ERLANG NUMBER | CONNECTION RATIOA | ID |
|---|---|---|---|---|---|---|---|
| 2004/11/20 | 0:00:00 | 51 | 762 | 762 | 7 | 92.2 | 2004/11/20 0:00:00 |
| 2004/11/21 | 0:00:00 | 51 | 955 | 955 | 8 | 93.2 | 2004/11/21 0:00:00 |
| 2004/11/25 | 0:00:00 | 51 | 1,111 | 1,111 | 11 | 93.0 | 2004/11/25 0:00:00 |
| 2004/11/26 | 0:00:00 | 51 | 1,082 | 1,082 | 10 | 94.5 | 2004/11/26 0:00:00 |
| 2004/11/27 | 0:00:00 | 51 | 1,088 | 1,088 | 10 | 90.6 | 2004/11/27 0:00:00 |
| 2004/11/28 | 0:00:00 | 51 | 937 | 937 | 9 | 95.7 | 2004/11/28 0:00:00 |
| 2004/11/29 | 0:00:00 | 51 | 1,125 | 1,125 | 11 | 93.2 | 2004/11/29 0:00:00 |
| 2004/11/30 | 0:00:00 | 51 | 998 | 998 | 9 | 81.3 | 2004/11/30 0:00:00 |
| 2004/12/1 | 0:00:00 | 51 | 783 | 783 | 9 | 94.2 | 2004/12/1 0:00:00 |
| 2004/12/10 | 0:00:00 | 51 | 867 | 867 | 10 | 92.4 | 2004/12/10 0:00:00 |
| 2004/12/11 | 0:00:00 | 51 | 963 | 963 | 12 | 92.9 | 2004/12/11 0:00:00 |
| 2004/12/12 | 0:00:00 | 51 | 810 | 810 | 13 | 91.7 | 2004/12/12 0:00:00 |
| 2004/12/13 | 0:00:00 | 51 | 1,040 | 1,040 | 9 | 94.3 | 2004/12/13 0:00:00 |
| 2004/12/14 | 0:00:00 | 51 | 758 | 758 | 9 | 90.8 | 2004/12/14 0:00:00 |
| 2004/12/15 | 0:00:00 | 51 | 870 | 870 | 9 | 91.1 | 2004/12/15 0:00:00 |
| 2004/12/2 | 0:00:00 | 51 | 764 | 764 | 8 | 90.0 | 2004/12/2 0:00:00 |
| 2004/12/28 | 0:00:00 | 51 | 595 | 595 | 7 | 87.5 | 2004/12/28 0:00:00 |
| 2004/12/29 | 0:00:00 | 51 | 692 | 692 | 7 | 90.7 | 2004/12/29 0:00:00 |
| 2004/12/3 | 0:00:00 | 51 | 767 | 767 | 9 | 92.8 | 2004/12/3 0:00:00 |
| 2004/12/30 | 0:00:00 | 51 | 572 | 572 | 8 | 85.9 | 2004/12/30 0:00:00 |
| 2004/12/31 | 0:00:00 | 51 | 744 | 744 | 9 | 87.4 | 2004/12/31 0:00:00 |

PRESS [F1] TO DISPLAY HELP                                   NUM

OPERATION MONITORING APPARATUS, CAUSE EVENT ESTIMATING METHOD FOR THE SAME, AND INFORMATION COMMUNICATION NETWORK SYSTEM

CROSS-REFERENCE TO RELATED APPLICATION

This application is based upon and claims the benefit of priority of the prior Japanese Patent Application No. 2012-130198, filed on Jun. 7, 2012, the entire contents of which are incorporated herein by reference.

FIELD

The embodiments discussed herein are related to an operation monitoring apparatus, a cause event estimating method for the same, and an information communication network system.

BACKGROUND

In these days, an information communication network systems such as a cellular phone and internet have advanced with increasing speed in respect of complexity and scale. In accordance with the advancement, an operator or surveillant engaged in the operation businesses or monitoring business of the information communication network system have the difficulty in accurately grasping the operational state on the system.

For example, one example of the information communication network systems includes a system typified by the cellular phone. In the system, there is a case where the observation data regarding the operational and radio environmental states of a base station and the cellular phone is observed in unit of hundred of items in the base station. Moreover, the number of base stations sometimes reaches tens of thousands. Accordingly, the amount of observation data to be collected increases to an extraordinary degree, and it is difficult for the operator or the surveillant to accurately grasp the operational state of the information communication network system.

In particular, the operation or monitoring business of the information communication network system include individual characteristic in the system (or unique to the system) and an element (or factor) that exerts influence on the characteristic. As a result, the operator or surveillant depends on individual skill such as associated knowledge and experience in the operation or monitoring businesses. Accordingly, it is a problem in the management or monitoring businesses to be qualitatively maintained and improved in the information communication network system.

In order to compensate for a lack of knowledge or experience for the manager or surveillant, for example, there is a case where a data mining technology is applied. The data mining technology, for example, is a technology that data analyzing technique such as artificial intelligence and so on is applied to a large amount of data, and knowledge is taken out.

However, regarding the data mining technique, for example, the processing time increases in accordance with the expansion or complication of the system, when the information communication network system is expanded or complicated. Accordingly, there is a limit in the case where the data mining technique is applied to the information communication network system.

Under the circumstances, for example, there is a technology as follows. That is, there is the technology that candidate for failure part based on each alarm signal is estimated, the failure part is identified automatically by finding a common set between the candidates for failure parts, and a part where failure occurs is diagnosed promptly by analyzing the factor of occurrence of the failure to be identified in accordance with the instructions by the operator.

Further, there is a causality relation derivation system to analyze the causality relation of data in appropriate memory capacity and processing time, by collecting data regarding yield of a product and calculating the causality relation of a multitude of data with a conditional probability, in a causality relation derivation kernel interface.

Japanese Laid-open Patent Publication No. 05-114899
Japanese Laid-open Patent Publication No. 2000-288877

However, the technology of estimating the candidates for failure part described above and the technology of calculating the causality relation with the conditional probability are aimed at estimating the failure part or calculating the causality relation of multitude of data. Accordingly, the technologies described above, for example, make it possible to estimate the failure part, but fail to notify the operator or surveillant what cause of the occurrence of failure is. Further, the technologies described above make it possible to calculate the causality relation of data, but fail to notify the operator or the surveillant what the cause hiding behind the data is.

Accordingly, in the information communication network system, the technologies described above fail to notify the operator or the surveillant what the cause hiding behind the observation data is, and what way to cope with the cause is, in a huge mass of the observation data.

For example, there is a case where fluctuation in traffic is monitored by the operator or the surveillant in the information communication network system typified by the cellular phone. The fluctuation in traffic has a characteristic of being substantially affected by transfer of the cellular phone and regional property (for example, residential area and business area), for example. Accordingly, it is difficult to instantly identify the cause such as the transfer of cellular phone, the regional property, and so on, which are attributed to the acquisition of the observation data, from the observation data collected by the base station regarding the fluctuations in traffic.

Or, it is difficult to instantly determine whether the cause of the deterioration is ascribed to the process ability of a system apparatus (for example, base station control apparatus) or a lack of radio resource and appropriately respond in the information communication network system, when value of the observation data is transferred in direction of deterioration with respect to a threshold value.

For example, in any one of the two technologies described above, it fails to identify cause of acquisition of the observation date based on the observation date.

Further, in the technologies described above, for example, there is no argument as to how appropriate observation data is identified or narrowed when the huge mass of observation data is obtained in the information communication network system. When the cause is identified from the huge mass of observation data in the information communication network system, there is a case that it takes a lot of time to identify the cause.

SUMMARY

According to an aspect of the embodiments, an operation monitoring apparatus for estimating a cause by which a first and second observation data observed by a monitored apparatus are obtained, the operation monitoring apparatus including: an observation event receiving process unit which receives the first and second observation data transmitted from the monitored apparatus; an observation event extracting unit which extracts the first observation data, out of the first and second observation data, based on a probability that the cause occurs with respect to the first and second observation data; a cause event determining process unit which estimates the cause based on the extracted first observation data; and a cause notifying process unit which outputs data indicating the estimated cause.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a flowchart schematically illustrating an example of a cause event estimating method;

FIG. 12 is a diagram illustrating an example of observation result;

FIG. 14 is a diagram illustrating an example of observation event;

FIG. 15 is a flowchart illustrating an example of processes in the O&M system;

FIG. 16 is a diagram illustrating an example of the observation event;

FIG. 17 is a diagram illustrating an example of the cause event;

FIG. 18 is a diagram illustrating an example of a table to estimate the cause event;

FIGS. 19A and 19B are diagrams illustrating examples of the table for estimating the cause event;

FIG. 21 is a diagram illustrating an example of coping method to the observation event and estimated cause event;

FIG. 23 is a diagram illustrating an example of the observation event;

FIGS. 26A to 26C are diagrams illustrating examples of the relation between the observation event and cause event;

FIG. 27 is a diagram illustrating an example of calculation result of a degree of involvement to the observation event;

FIG. 30 is a diagram illustrating an example of screen display for the observation data;

DESCRIPTION OF EMBODIMENTS

Hereinafter, the embodiments of the present invention will be described.

First Embodiment

Figure 1:
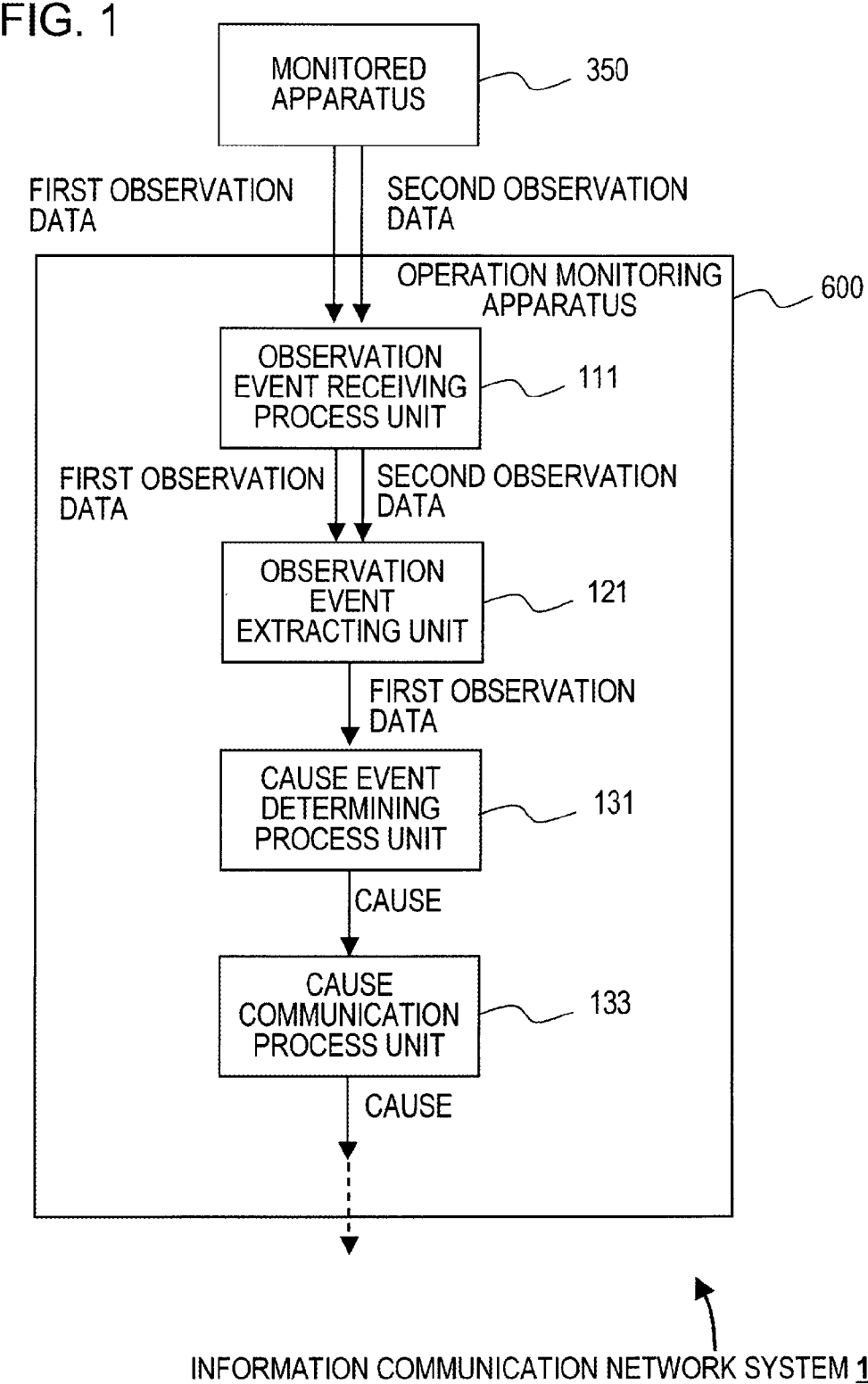
FIG. 1 is a diagram illustrating an example of the configuration of an information communication network system.

First, a first embodiment will be described. FIG. 1 is a diagram illustrating an example of the configuration of an information communication network system 10 according to the first embodiment. The information communication network system 10 includes a monitored apparatus 350 and an operation monitoring apparatus 600.

The monitored apparatus 350 observes a first observation data and second observation data. The monitored apparatus 350 transmits the observed first and second observation data to the operation monitoring apparatus 600.

The operation monitoring apparatus 600 monitors the monitored apparatus 350 and estimates cause by which the first and second observation data are obtained with respect to the first and second observation data observed by the monitored apparatus 350, for example.

As illustrated in FIG. 1, the operation monitoring apparatus 600 includes an observation event receiving process unit 111, an observation event extracting unit 121, a cause event determining process unit 131, and a cause communication process unit 133.

The observation event receiving process unit 111 receives the first and second observation data transmitted from the monitored apparatus 350.

The observation event extracting unit 121 extracts the first observation data, out of the first observation data and second observation data, based on probability that cause occurs with respect to the first and second observation data occurs.

The cause event determining process unit 131 estimates the cause based on the extracted first observation data.

The cause communication process unit 133 outputs data indicating the estimated cause.

Thus, the operation monitoring apparatus 600 extracts target observation data being subject to estimate the cause, based on the probability of occurrence of the cause, of the first and second observation data obtained from the monitored apparatus 350, for example.

Accordingly, even when the operation monitoring apparatus 600 obtains a huge mass of observation data (or observation events), the operation monitoring apparatus 600 can extract the observation data being subject to estimate the cause (or cause event), out of the huge mass of observation data, and can estimate the cause based on the extracted observation data, for example. Consequently, the operation monitoring apparatus 600 can estimate the cause event from the huge mass of observation data.

The operation monitoring apparatus 600 can output data indicating the cause estimated by the cause communication process unit 133. For example, the operation monitoring apparatus 600 is connected to a display unit such as a monitor, a display, or the like, and can notify via the display unit an operator and surveillant of the cause by which the first and second observation data are obtained, by outputting the data indicating the cause to the display unit.

For example, the operator or the surveillant can take various coping method to the information communication network system 10 based on the cause displayed on the display unit, thereby decision-making for the operator or the surveillant can be supported.

Further, the operation monitoring apparatus 600 appropriately transmits the data indicating the cause to the display units, thereby the cause is displayed in time series. Accordingly, for example, the operator or the surveillant can recognize the time-series change of the cause and recognize the change or displacement in the operational state of the information communication network system 10. Consequently, the operation monitoring apparatus 600 can appropriately notify the operator or the surveillant of the change or displacement in the operational state of the information communication network system 10.

Second Embodiment

Next, a second embodiment will be described. The second embodiment will be described in the following order, aimed at facilitating easy understanding.

Figure 2:
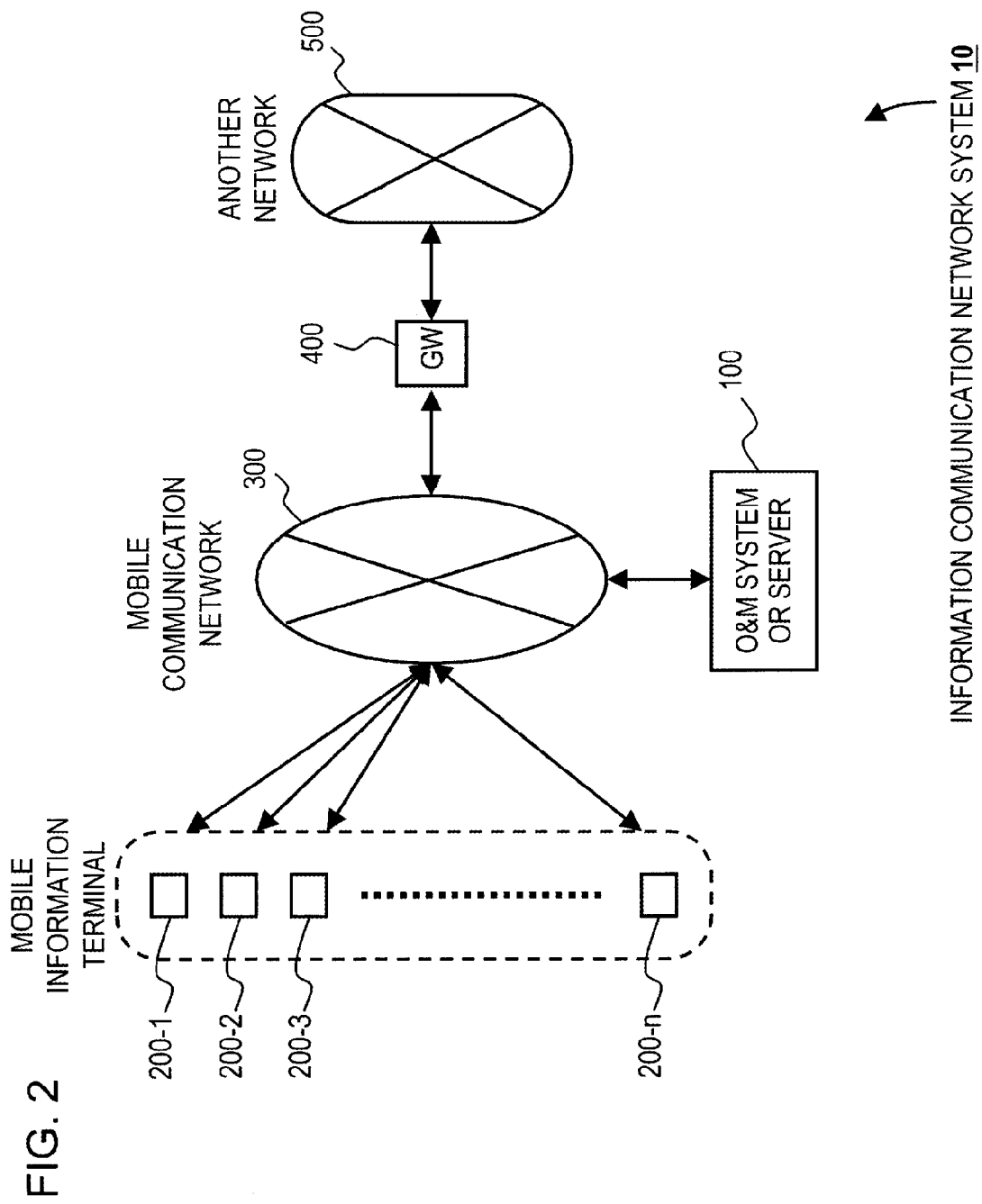
FIG. 2 is a diagram illustrating an example of the configuration of the information communication network system.

First, an example of the entire configuration of the information communication network system according to second embodiment will be described. For example, FIG. 2 is a diagram illustrating an example of the entire configuration of the information communication network system 10.

Next, the example of the configuration of an O&M (Operation and Maintenance) system 100 in the information communication network system 10 will be described.

For example, the O&M system 100 is a server or operation monitoring apparatus that estimates the cause by which the observation data is obtained (or the cause hiding behind the observation data), based on the observation data to be observed or collected in the information communication network system 10, and further provides way to cope with the cause. For example, the O&M system 100 corresponds to the operation monitoring apparatus 600 in the first embodiment.

For example, the O&M system 100 notify the operator of the estimated cause, so that the operator can recognize the operational state of the information communication network system 10. Further, the O&M system 100 notifies the operator of the cope method, so that the operator can perform appropriate way immediately.

In the embodiments of the present invention, for example, it is noted that there is a case where the observation data is referred to as an observation event, and the cause obtained based on the observation data (or cause hiding behind the observation data) is referred to as a cause event.

Figure 3:
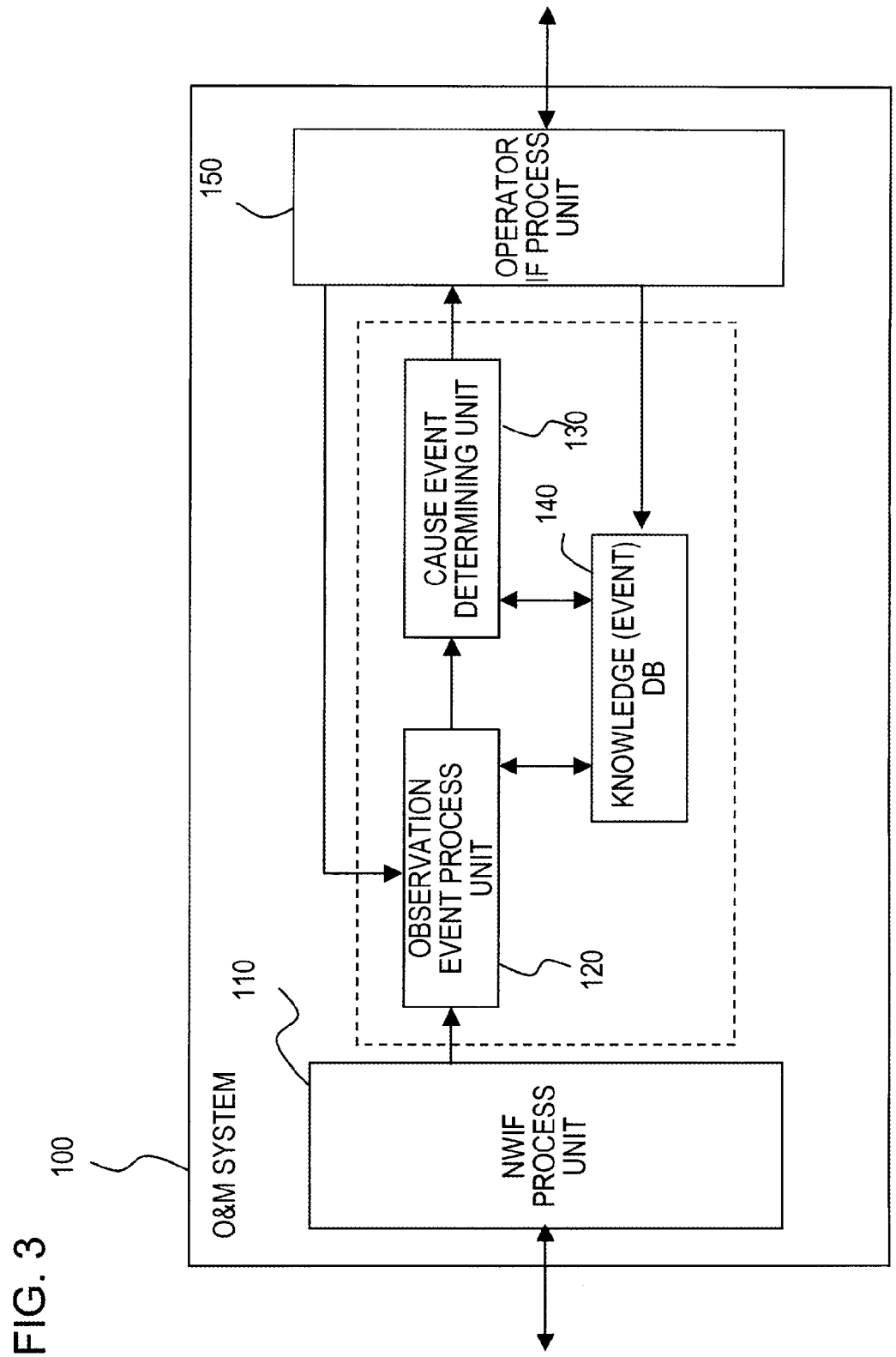
FIG. 3 is a diagram illustrating an example of the configuration of an O&M system.
Figure 4:
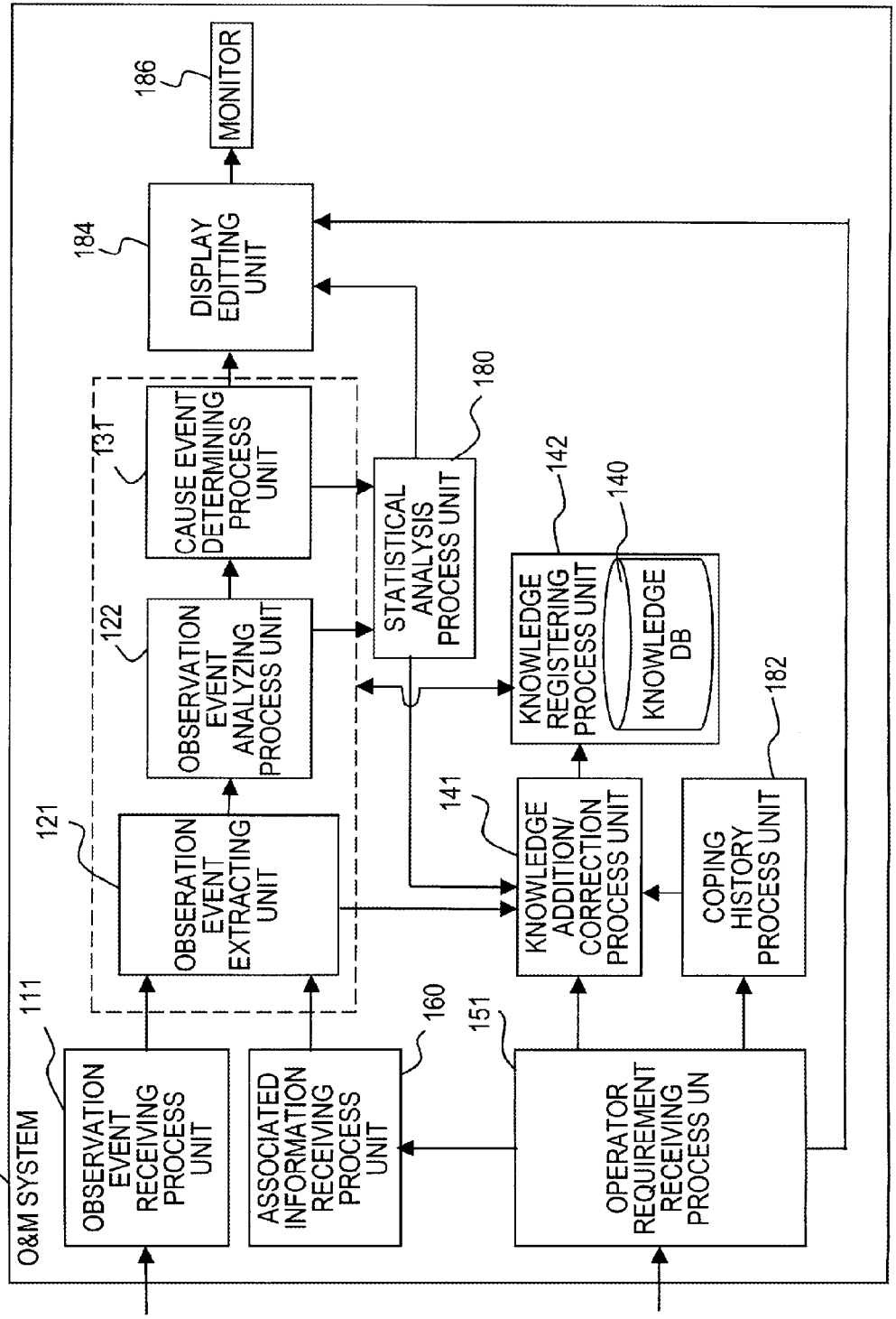
FIG. 4 is a diagram illustrating an example of the configuration of the O&M system.

In particular, in the second embodiment, the O&M system 100 can identify which the observation event to focus on, and estimate the cause event from the identified observation event. For example, FIGS. 3 and 4 are diagrams illustrating examples of the configuration of the O&M system 100.

Figure 5:
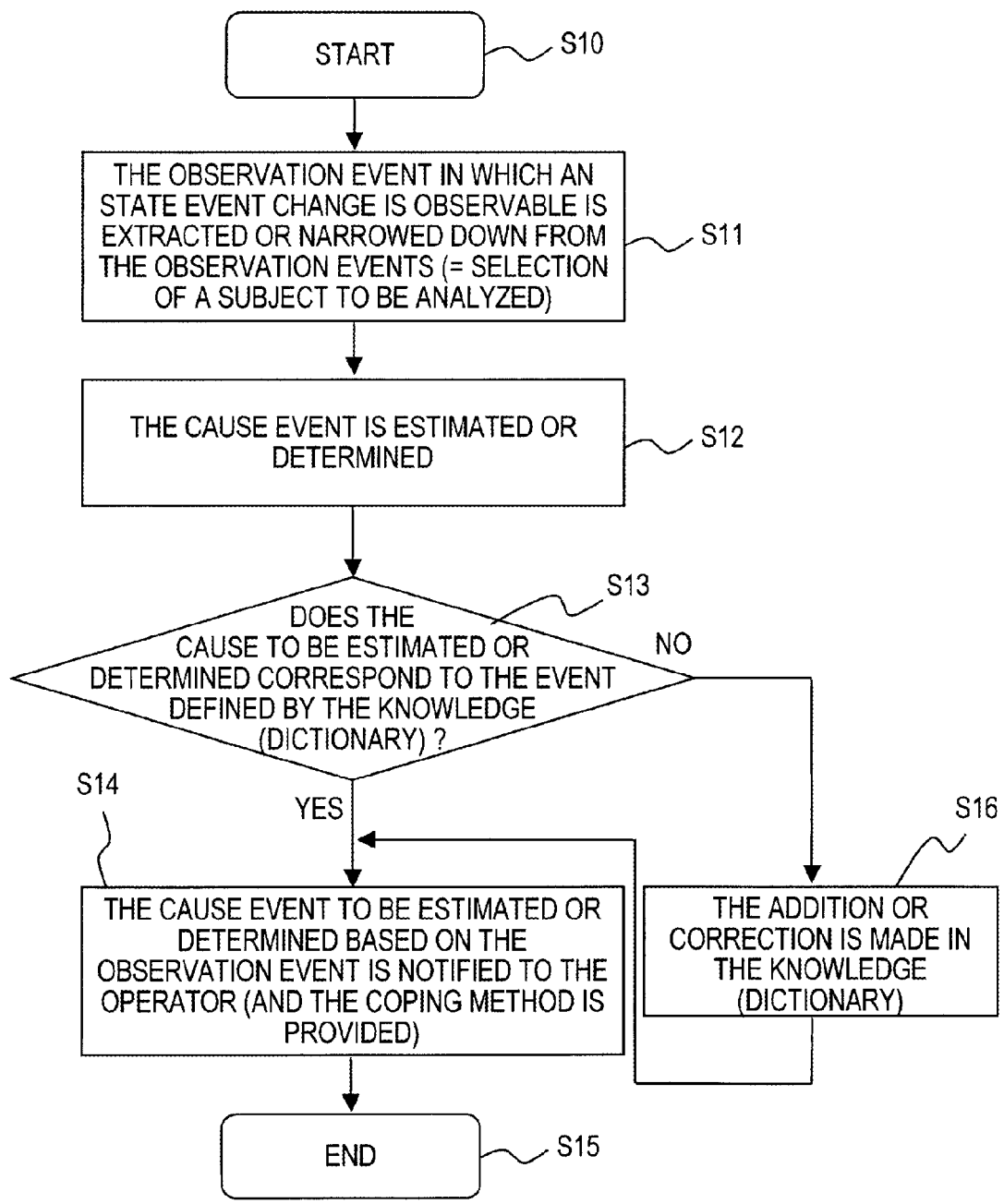
FIG. 5 is a flowchart illustrating an example of the entire operation in the O&M system.

Next, an example of the entire operation in the O&M system 100 will be described. FIG. 5 is a flowchart illustrating an example of the operation of the O&M system 100.

Next, the relation between the observation event and cause event will be described by modeling the observation event and so on. Further, an example of implementation model as to how the cause event is estimated in the O&M system 100 will be described. FIGS. 6 to 10 are diagrams illustrating respective examples of the model.

Next, a concrete example of a method of estimating the cause event and concrete processing example in the O&M system 100 will be described. In the description, each concrete example of the observation event and the cause event will be described. Further, a concrete example of a coping method being provided by the O&M system 100 provides will be described. FIGS. 13 to 23 are diagrams respectively illustrating examples of the process.

Figure 24:
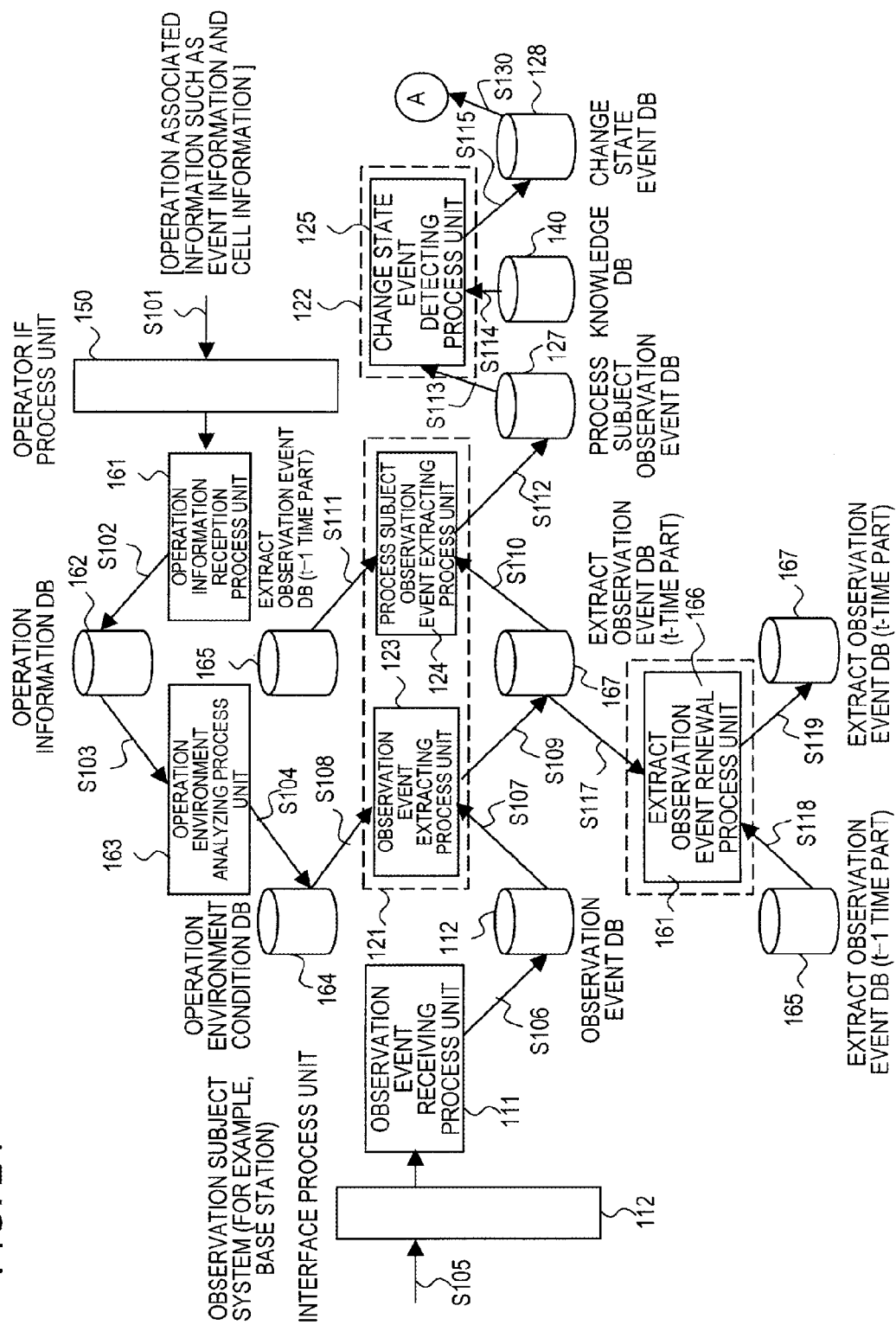
FIG. 24 is a diagram illustrating an example of process in the O&M system.
Figure 25:
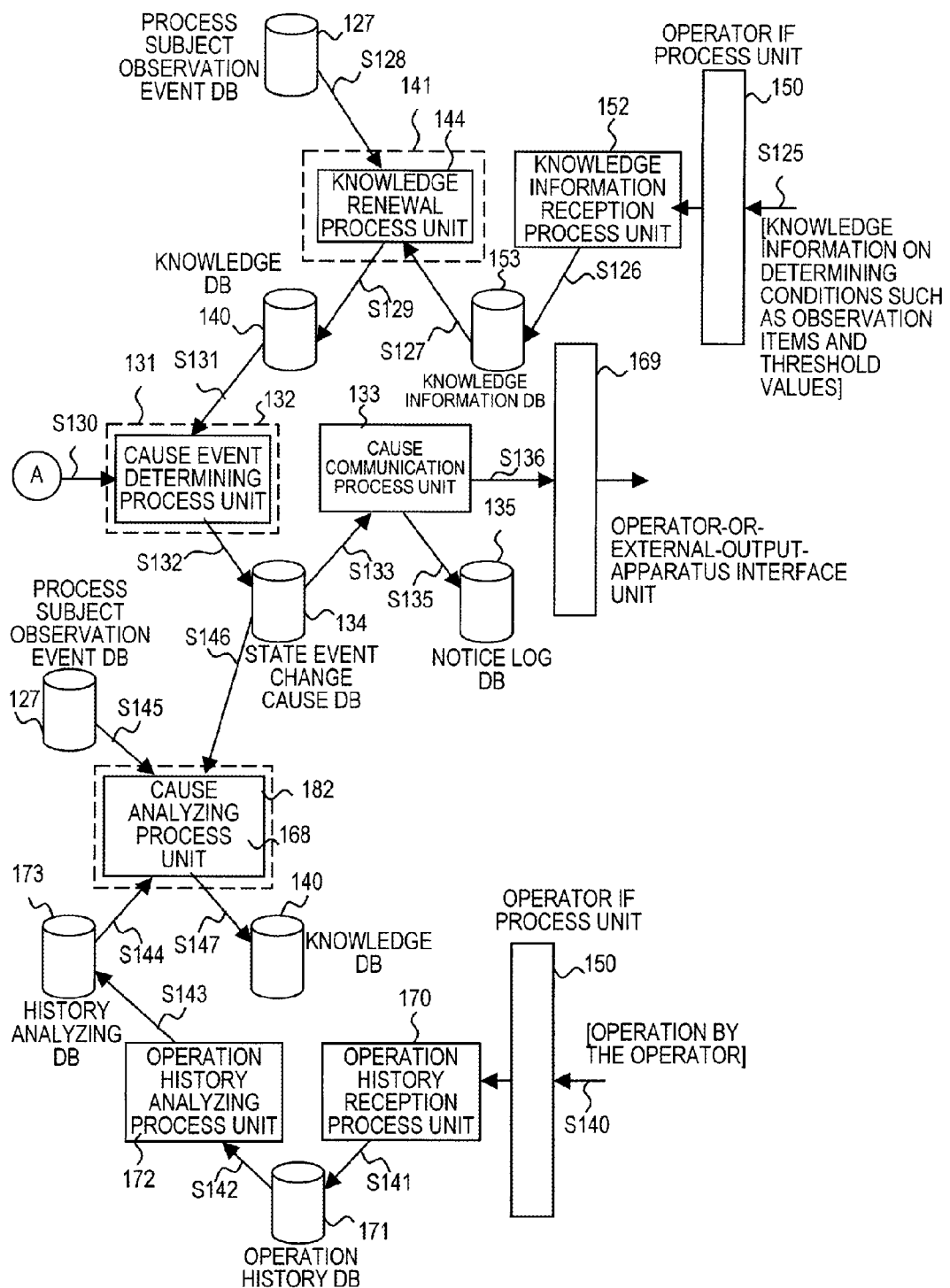
FIG. 25 is a diagram illustrating an example of process in the O&M system.

Next, an operation example of estimating the cause event and providing the coping method will be described. In the description, the processes described in FIGS. 11 to 23 are described together as an example of the entire operation. FIGS. 24 and 25 are diagrams respectively illustrating examples of the operation.

Finally, a narrowing process to estimate or determine the cause event with respect to the observed or collected observation event will be described. Accordingly, for example, the observation event which is subject to be observed is narrowed down from a huge mass of observation events in the O&M system 100, and a process of estimating or determining the cause event can be carried out based on the narrowed observation event. The O&M system 100 can refine the cause event hidden in the observation event and simplify the process, by carrying out the process. FIGS. 26A to 29 are diagrams respectively illustrating operation examples of the narrowing process.

<Configuration Example of Information Communication Network System 10>

FIG. 2 is the diagram illustrating a configuration example of the information communication network system 10. For example, the information communication network system 10 can be applied to a large-scale information processing system such as a banking system in bank, a data center system managing customer information in credit card company, or the like. For example, the information communication network system 10 illustrated in FIG. 2 is exemplified as a mobile communication system.

The information communication network system 10 includes the O&M system or a server (hereinafter, also referred to as "O&M system") 100, a mobile information terminal 200 (200-1, 200-2, . . . , 200-$n$), a mobile communication network 300, a GW (gateway) 400, and an another network 500.

The mobile information terminal 200 can perform radio communication with a radio base station (not illustrated) connected to the mobile communication network 300. The mobile information terminal 200 can transmit and receive data to and from a server connected to the another network 500 or an another mobile information terminal 200 wirelessly connected to an another radio base station, via the radio base station. For example, the mobile information terminal 200 is a portable information terminal such as a feature phone, a smart phone, a PDA (Personal Digital Assistance), and so on. For example, the mobile information terminal 200 is a monitored apparatus in the O&M system 100. Further, the mobile information terminal 200 corresponds to the monitored apparatus 350 in the first embodiment.

For example, the mobile communication network 300 is a network to be connected when the mobile information terminal 200 performs communication. The mobile communication network 300 is connected to a radio base station control apparatus controlling one radio base station or more, for example. For example, when data is transmitted and received between the mobile information terminal 200 and the server, the radio base station includes a function of relaying the data, by way of converting the data into radio signal. For example, the radio base station also is the monitored apparatus in the O&M system 100 and corresponds to the monitored apparatus 350 in the first embodiment.

The O&M system 100 is connected to the mobile communication network 300, and performs operation or monitoring of the operational state of the information communication network system 10, for example. That is, the O&M system 100 can estimate or determine (hereinafter, also referred to as "estimate") the cause by which the observation data is obtained (or cause hiding behind the observation data) based on the observed or collected observation data, and can provide (or output) the coping method. In this time, the O&M system 100 performs the narrowing process based on the observed observation events and performs estimating process of the cause event based on the narrowed observation event. The processes performed in the O&M system 100 will be described later in detail. It is noted that the O&M system 100 corresponds to the operation monitoring apparatus 600 in the first embodiment, for example.

The subjecting observation events observed by the O&M system 100 include the radio base station connected to the mobile information terminal 200 or the mobile communication network 300, the radio base station control apparatus, the GW 400, the server connected to the another network 500, the mobile communication network 300, and the another network 500, for example. However, in the second embodiment, in order to facilitate easy understanding, the mobile communication network 300 and the mobile information terminal 200 will be described in below as a subject of the observation event.

The GW 400 is a node connecting the mobile communication network 300 with the another network 500 and converts the protocol of data passing through the mobile communication network 300 and the another network 500, for example.

The another network 500 is a communication network performing transmission and reception by TCP/IP (Transmission Control Protocol/Internet Protocol), for example. The another network 500 is connected to a server providing internet services, and so on, for example. The server can transmit and receive data to and from the mobile information terminal 200.

<Example of Configuration O&M System 100>

FIGS. 3 and 4 are diagrams illustrating examples of the configuration of the O&M system 100. The example of the configuration of the O&M system 100 illustrated in FIG. 4 represents a more detailed illustration, compared with the example of the configuration of the O&M system 100 illustrated in FIG. 3.

The O&M system 100 illustrated in FIG. 3 will be described. The O&M system 100 includes a NWIF (network interface) process unit 110, an observation event process unit 120, a cause event determining unit 130, a knowledge DB 140, and an operator IF process unit 150.

The NWIF process unit 110 is connected to the mobile communication network 300 (or the radio base station control apparatus, or the like) and receives the observation event observed in the base station, or the like, for example. The NWIF process unit 110 converts the observation event received from the mobile communication network 300 into data having a format processable in the O&M system 100, and outputs the converted data to the observation event process unit 120, for example.

The observation event process unit 120 performs the narrowing process to estimate the cause event with respect to the observation event received from the NWIF process unit 110, for example. In this time, the observation event process unit 120 can also perform the narrowing process of the observation event based on associated information received from the operator IF process unit 150, for example. The detail of the associated information and so on will be described below. And, the observation event process unit 120 stores the narrowed observation event in the knowledge DB 140 and outputs the narrowed observation event to the cause event determining unit 130, for example. Further, the observation event process unit 120 extracts a distinctive factor from the narrowed observation event (detects a changing state event or the like) and outputs the distinctive factor to the cause event determining unit 130. The detail of the observation event process unit 120 will be described below.

The cause event determining unit 130 receives the observation event and the distinctive factor from the observation event process unit 120 and estimates the cause event to be assumed with respect to the observation event, for example. The cause event determining unit 130 outputs the estimated cause event to the operator IF process unit 150 and stores the estimated cause event in the knowledge DB 140, for example. The detail of the estimating process of the cause event and so on will be described below.

The knowledge DB 140 stores the observation event narrowed by the observation event process unit 120 and the cause event estimated by the cause event determining unit 130 (or data indicating the cause event, and hereinafter the cause event and the data indicating the cause event are not distinguished, but merely referred to as the "cause event"), for example. The events registered in the knowledge DB 140 is referred to as "knowledge information", for example. In the diagrams, there is a case of illustrating as a phrase of "Na-Re-Ji", however there is a case of referring the phrase of "Na-Re-Ji" as "knowledge" in the specification.

The operator IF process unit 150 is connected to a monitor and a keyboard manipulated by the operator and performs process of converting data format so as to display the cause event output from the cause event determining unit 130 on the monitor and so on, for example. The operator IF process unit 150 receives observation item and associated information specified by the operator by means of the keyboard manipulated by the operator and converts the received observation item and associated information into data having a format processable in the O&M system 100, for example. And, the operator IF process unit 150 registers the received observation item in the knowledge DB 140 and outputs the associated information to the observation event process unit 120, for example.

FIG. 4 is a diagram illustrating an example of the detailed configuration of the O&M system 100. The O&M system 100 includes the observation event receiving process unit 111, an associated information receiving process unit 160, the observation event extracting unit 121, an observation event analyzing process unit 122, the cause event determining process unit 131, a statistical analysis process unit 180, a knowledge addition/correction process unit 141, a knowledge registering process unit 142, an operator requirement receiving process unit 151, a cope history process unit 182, a display editing unit 184, and a monitor 186.

In view of the correlation between the O&M systems 100 in FIGS. 3 and 4, the NWIF process unit 110 in FIG. 3 corresponds to the observation event receiving process unit 111, for example. The observation event process unit 120 in FIG. 3 corresponds to the observation event extracting unit 121 and the observation event analyzing process unit 122, for example. Further, the knowledge DB 140 in FIG. 3 is held in the knowledge registering process unit 142, for example. Further, the operator IF process unit 150 in FIG. 3 corresponds to the operator requirement receiving process unit 151, for example.

The observation event receiving process unit 111 receives the observation event (or observation data) observed in the base station, for example. The observation event receiving process unit 111 receives the observation event in time series in the order of an observation event at a time n, an observation event at a time (n+1), or the like, for example.

There is "transmission power increase" and "position registration impossibility" as the observation event, for example. Although the detail of the observation event is described below, the examples of the observation event are illustrated in FIG. 14. Or, there is an information on value of transmission power, presence or absence of position registration and so on, as the observation event, and the observation event receiving process unit 111 can obtain the observation event such as "transmission power increase" and "position registration impossibility" by comparing the received information with a threshold value, for example.

The associated information receiving process unit 160 receives the associated information (or operation information) from the operator requirement receiving process unit 151 and outputs the received associated information to the observation event extracting unit 121, for example. The associated information includes event information and cell information, for example. The event information includes an information relating to an event such as a concert in a certain area or a firework event in a place. The cell information includes an information relating to the base station such as an information indicating that a certain base station is out of order, or the certain base station is temporarily halted, for example.

The observation event extracting unit 121 performs the narrowing process with respect to the observation event and outputs the narrowed observation event to the observation event analyzing process unit 122 and the knowledge addition/correction process unit 141, for example. The observation event extracting unit 121 can refer to the associated information in performing the narrowing process, for example. The detail of the narrowing process will be described below.

The observation event analyzing process unit 122 extracts the distinctive factor and so on with respect to the narrowed observation event, for example. For example, the observation event analyzing process unit 122 can extract the distinctive factor by detecting a state change with respect to the narrowed observation event to. The observation event analyzing process unit 122 outputs the extracted distinctive factor and the narrowed observation event to the cause event determining process unit 131.

The cause event determining process unit 131 estimates (or determines) the cause event to be assumed with respect to the observation event based on the distinctive factor, for example. The detail of the estimating process will be described below.

The statistical analysis process unit 180 analyzes in time series the observation event obtained by the observation event analyzing process unit 122 and the cause event obtained by the cause event determining process unit 131, analyzes association or correlation with similar event in the past, and registers the result in the knowledge DB 140 via the knowledge addition/correction process unit 141, for example. For example, when there is a change of the observation event between a certain time zone and a time zone prior to the certain time zone, the statistical analysis process unit 180 can overwrite the observation event at the certain time zone in the knowledge DB 140.

The knowledge addition/correction process unit 141 outputs the observation event and the cause event respectively obtained by the observation event extracting unit 121 and the cause event determining process unit 131, the result obtained by the statistical analysis process unit 180, and the manipulation history of the operator, obtained by the cope history process unit 182, and so on, to the knowledge registering process unit 142, for example. Accordingly, the knowledge addition/correction process unit 141 can add and registers the cause event and so on, in the knowledge DB 140.

The knowledge registering process unit 142 includes the knowledge DB 140, accesses the knowledge DB 140, and registers (or stores) the output from the knowledge addition/correction process unit 141 in the knowledge DB 140, for example. The knowledge registering process unit 142 can also read out the cause event stored in the knowledge DB 140 based on the requirement from the cause event determining process unit 131 or the like, and output the cause event to the cause event determining process unit 131, for example.

The operator requirement receiving process unit 151 receives the observation items required by the operator, a collection period, the registration and correction of the observation event such as a cell to be observed or the like, a threshold condition of the observation data, a subject item to be narrowed, a specification and correction of analysis condition such as a predictive period, a trigger condition, and so on, and the associated information, for example. The operator requirement receiving process unit 151 receives the operational manipulation (or cope manipulation) by the operator, for example. An example of the operational manipulation will be described later. The operator requirement receiving process unit 151 outputs the associated information to the associated information receiving process unit 160, outputs the operational manipulation, and so on to the cope history process unit 182, and outputs the observation item to the knowledge addition/correction process unit 141, for example.

The cope history process unit 182 receives the operational manipulation, and registers the history in the knowledge DB 140 when the history is stored as the coping method, for example. For example, when the O&M system 100 estimates the cause event, the cope history process unit 182 can register how the operator coped with the cause event in the knowledge DB 140 as operational manipulation history (cope history, operational manipulation, or the like).

The display editing unit 184 generates a graphic format of the cause event output from the cause event determining process unit 131 or the output from the statistical analysis process unit 180, or converts a tabular format, in accordance with requirement of the operator requirement receiving process unit 151, for example. The display editing unit 184 outputs the converted cause event and so on to the monitor 186. The requirement of the operator requirement receiving process unit 151 includes a display section, a display format, and so on, for example.

The monitor 186 can display the output from the display editing unit 184, for example.

<Example of Entire Operation of O&M System 100>

Next, an example of the entire operation of the O&M system 100 will be described. FIG. 5 is a flowchart illustrating the example of the entire operation of the O&M system 100. The detail of the estimating process or the narrowing process cause will be described later. Herein, the example of the entire operation of the O&M system 100 will be described.

When the O&M system 100 starts the process (S10), the O&M system 100 performs extracting or narrowing process of the observation event deemed as state event change, based on the observation event (S11).

For example, the present process is performed in such a manner that the observation event extracting unit 121 performs the narrowing process with respect to the observation event received from the observation event receiving process unit 111. The detail of the narrowing process will be described below, referring to FIGS. 26 to 29. It is noted that the extracting process for the distinctive factor performed in the observation event analyzing process unit 122 may be performed in the course of the present process.

Next, the O&M system 100 estimates the cause event (S12). For example, the cause event determining process unit 131 estimates the cause event based on the distinctive factor output from the observation event analyzing process unit 122. The detail of the estimating process of the cause event will be described below, referring to FIGS. 11 to 23.

Next, the O&M system 100 determines whether the estimated cause event is an event defined by the knowledge DB 140 or not (S13). This process is to notify the operator of what the estimated cause event is obtained comparison with the cause event obtained in the past, for example. For example, the cause event determining process unit 131 can access the knowledge DB 140 via the knowledge registering process unit 142 and determine whether the cause event identical with or similar to the estimated cause event is registered in the knowledge DB 140 or not.

When the estimated cause event is the event defined by the knowledge DB 140 (S13, YES), the O&M system 100 notifies the operator of the estimated cause event (S14).

For example, when the cause event determining process unit 131 confirms that the cause event identical with or similar to the estimated cause event is registered in the knowledge DB 140, the cause event determining process unit 131 displays the estimated cause event on the monitor 186 via the display editing unit 184.

The O&M system 100 ends process (S15).

On the other hand, when the estimated cause event is not the event defined by the knowledge DB 140 (S13, NO), the O&M system 100 registers the estimated cause event in the knowledge DB 140 (S16). For example, the cause event determining process unit 131 outputs the estimated cause event to the statistical analysis process unit 180 and registers the estimated cause event in the knowledge DB 140 via the statistical analysis process unit 180 and the knowledge addition/correction process unit 141.

Next, the O&M system 100 registers in the knowledge DB 140 content that the estimated cause event is not the event defined by the knowledge DB 140, and notifies the estimated cause event to the operator (S14).

In addition, the O&M system 100 ends process (S15).

Now, the example of the entire operation of the O&M system 100 is described above. In view of the whole flow, the O&M system 100 performs the narrowing process from the observation event (S11), and further performs the estimating process of the cause event with respect to the narrowed observation event (S12).

<Description of Implementation Model>

Next, the implementation model to implement the estimation of the cause event and the estimating method of the cause event will be described.

Figure 6:
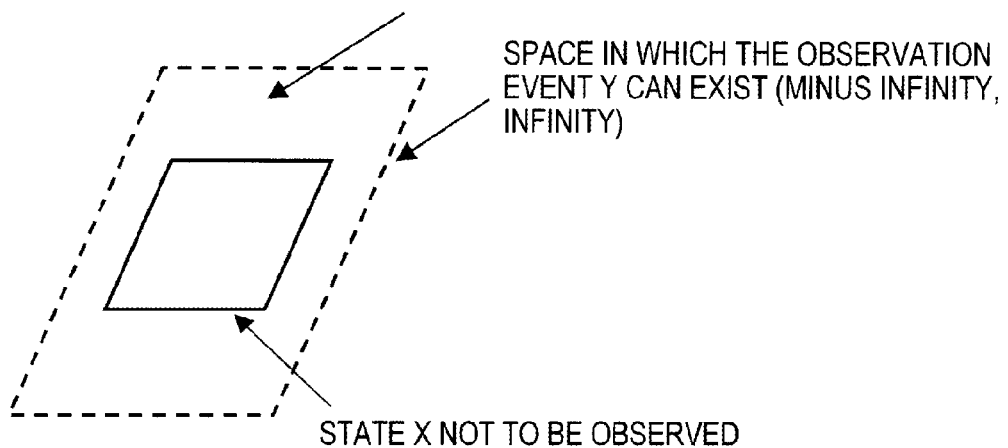
FIG. 6 is a diagram illustrating an example of an observation model.

FIG. 6 is a diagram illustrating an example of the observation model in the O&M system 100 and illustrating an example of relation between the observation event and the cause event.

For example, as illustrated in FIG. 6, when the event to be observed (=observation event) is represented as "Y", and a space in which the observation events Y can exist is logically represented as $(-\infty, \infty)$. The space in which the observation events Y can actually exist can be represented as finite closed space.

For example, in the information communication network system 10 (for example, FIG. 2), the base station can observe various observation data such as "transmission power increase" and so on as the observation event. However, the observation event that the base station can actually observe is a part of the entire observation event. Accordingly, the space in which the observation events Y can actually exist is represented as the finite closed space.

In addition, when the event not to be observed (or the cause event to be estimated) is represented as "X", the event X not to be observed is illustrated FIG. 6 for example, as an event inherent in the observation event Y.

For example, a case will be assumed where the observation event Y such as "transmission power increase", "traffic is high in a self cell", and so on are obtained in the base station, and the corresponding cause events X is "loads are concentrating" and "there exists an error in the setting parameter". In this case, the cause event X such as "loads are concentrating" and so on can be represented as the event inherent in the observation event Y (such as "transmission power increase", "traffic is high in a self cell", and so on). Accordingly, the observation model can be exemplified as illustrated in FIG. 6.

In the observation model illustrated in FIG. 6, when the observation event Y is regarded as a response variable, the event X not to be observed is regarded as an explanatory variable. In the observation model, the O&M system 100 estimates the event X not to be observed with respect to the observation event Y.

Figure 7:
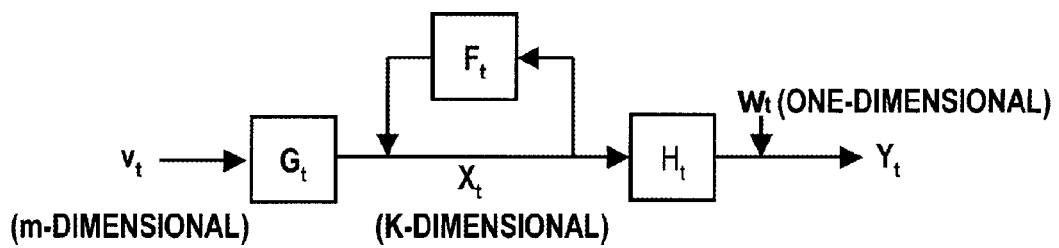
FIG. 7 is a diagram illustrating an example of a system model.

FIG. 7 is a diagram illustrating an example of the system model regarding the cause event X and the observation event Y.

In the case where the observation event observed at a time t is "Yt", and the state to be estimated at the time t is "Xt", the observation event Yt can be represented in the following formula (1).

$$Yt = Ht \cdot Xt + wt \quad (1)$$

Here, Ht represents a transfer function, and wt represents observation noise. Xt includes a k-dimensional variable, Yt includes i-dimensional variable, and Ht represents a (i×k) determinant.

Next, when the state Xt at the time t is dependently affected by a state Xt−1 at a time (t−1), the state Xt can be represented in the following formula (2).

$$Xt = Ft \cdot Xt{-}1 + Gt \cdot vt \quad (2)$$

Here, Ft and Gt represent a transfer function, vt represents a desired value.

As described above, when the formula (1) is considered to be a time-series model representing the mechanism of the observation value yt, Xt represents a coefficient, and the formula (2) represents an expression model of temporal change of the coefficient Xt.

As illustrated in FIG. 6, it is conceivable that the cause event X is the event inherent in the observation event Y. In this case, the problem of estimating the cause event X from the observation event Y can be replaced with the problem of estimating the state Xt={x1, x2 . . . xt} at a time t (note; j>t) from the observation event Yj={y1, y2, . . . yj}.

That is, the problem of estimating the cause event X from the observation event Y arrives at the problem of calculating a conditional probability P (Xt|Yj) calculating past states {x1, x2, . . . xt} based on the observation values {y1, y2, . . . yj} up to the time t (or the present time), for example.

Figure 8:
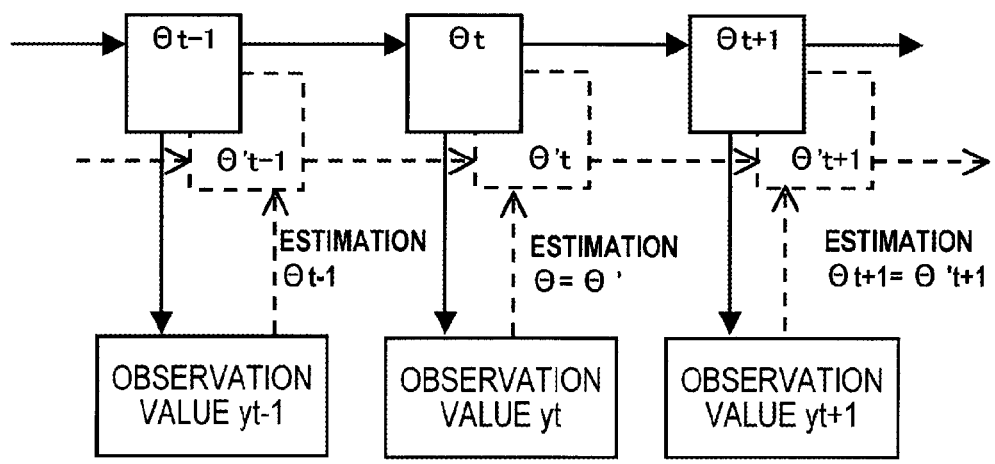
FIG. 8 is a diagram illustrating an example of an entire model.

FIG. 8 is a diagram illustrating an example of the model of temporal change representing the relation between the observation event Y and the cause event X. For example, the observation value yt is brought by the cause event Xt (actual state θt in FIG. 8), and the O&M system 100 estimates the cause event Xt from the observation value yt.

However, there is a case where the estimated cause event Xt (estimated state θ't in FIG. 8) corresponds to the original cause event Xt (estimated state θt in FIG. 8), or there is a case where the estimated cause event Xt does not completely correspond to the original cause event Xt.

Figure 9A:
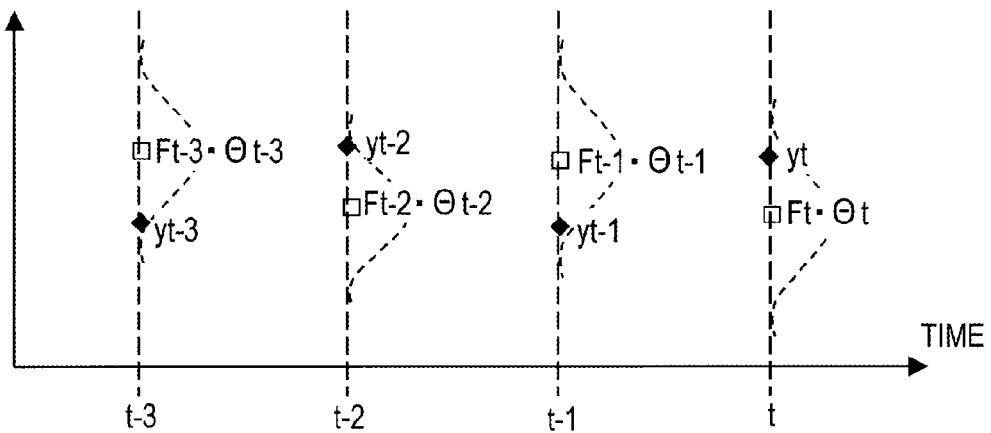
FIG. 9A is a diagram illustrating an example of time displacement in observation value distribution.
Figure 9B:
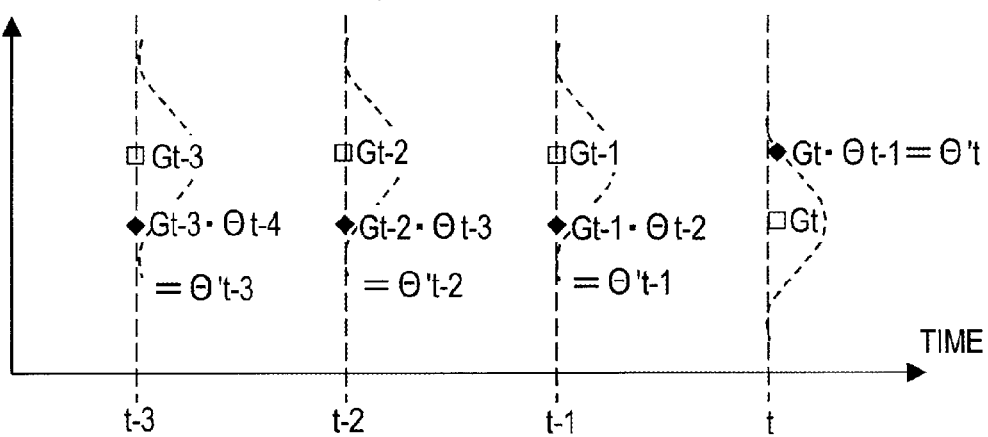
FIG. 9B is a diagram illustrating an example of time displacement in state distribution.

FIG. 9A is a diagram illustrating an example of time displacement of the observation event Y, and FIG. 9B is a diagram illustrating an example of time displacement of the cause event X. The observation event Y (observation value in FIG. 9A) actually changes as the time goes by, and the value is put within a range of normal distribution at each time.

For example, regarding the observation event of "transmission power increase", transmission power value shifts within a certain constant range, and the observation event of "transmission power increase" is obtained in the constant range.

Similarly, the cause event X changes as the time goes by, and the value is put within a range of the normal distribution at each time.

For example, regarding the cause event of "radio resource is running out", the event shifts within a certain constant range regarding to what extent the radio resource is running out, and the cause event of "radio resource is running out" is obtained in the constant range.

Figure 10:
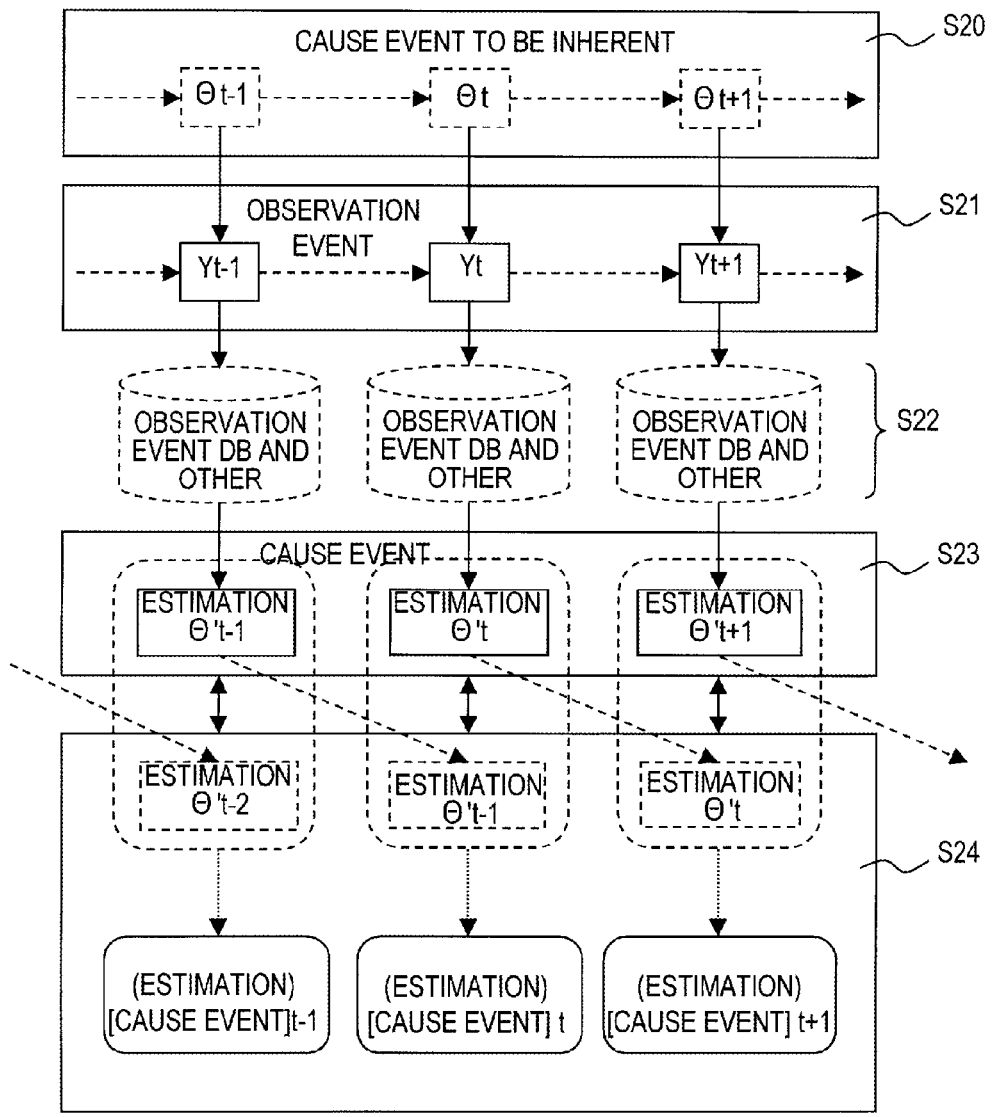
FIG. 10 is a diagram illustrating an example of an implementation model.

Based on the observation model and the system model described above, the implementation model to estimate the cause event can be constructed. FIG. 10 is a diagram illustrating an example of the implementation model to estimate the cause event.

The cause event θt inherent in the observation event Y changes as the time goes by (S20). The observation event Yt occurs due to the cause event et, and O&M system 100 observes the observation event Yt (S21).

In this case, for example, the O&M system 100 stores in a memory the observed (or collected) observation event Yt as a DB (for example, knowledge DB 140) (S22).

The O&M system 100 read out the observation event from the DB, and estimates the cause event Xt (estimated state θ't in FIG. 10) from the observation event Yt (S23).

In addition, for example, the O&M system 100 estimates the present cause event Xt from the cause event X (t−1) (estimated state θ't−1 in FIG. 10) estimated in the past time (time t−1) and the cause event Xt (estimated state θ't in FIG. 10) estimated in the present time (time t) (S24).

The implementation model illustrated in FIG. 10 can be implemented in the O&M system 100 illustrated in FIG. 4, for example. In this case, the estimation of the cause event X (S24 and S24) can be implemented in the observation event extracting unit 121, the observation event analyzing process unit 122, and the cause event determining process unit 131 in the O&M system 100 (for example, in FIG. 4), for example.

<Detailed Example of Operation>

Next, the example of the operation of the O&M system 100 will be described. As for the example of the operation, in order to facilitate easy understanding of the operation, the description will be made according to the following item and orders.

<1. Estimating method of cause event>
<2. Example of observation event and example of cause event>
<3. Example of process in the O&M System 100>
<4. Example of process in case where observation event is "connection ratio reduction">
<5. Example of estimating process of cause event>
<5.1 Example of estimating process of cause event in tabular format>
<5.2 Example of estimating process of cause event in decision format>
<6. Example of coping method>
<7. Example of other operation>

First, the estimating method of the cause event will be described referring to FIG. 11 (<1. Estimating method of cause event>). Second, the example of the observation event and the example of the cause event will be described referring to FIG. 12 (<2. Example of observation event and example of cause event>). Thirdly, the specific example of process in the O&M system 100 will be described referring to FIGS. 13 and 16 (<3. Example of processes in the O&M System 100> and <4. Example of process in case where observation event is "connection ratio reduction">). Fourthly, the example of the estimating process of the cause event will be described referring to FIGS. 18 and 19 (<5. Example of estimating process of cause event>). Fifthly, the example of the coping method will be described referring to FIG. 21 (<6. Example of coping method>). Lastly, the example of other operations will be described referring to FIGS. 22 and 23 (<7. Example of other operation>).

<1. Estimating Method of Cause Event>

FIG. 11 is a flowchart illustrating an example of the estimating method of the cause event. The example of the flowchart illustrated in FIG. 11 corresponds to a flowchart representing the detailed example in S12, out of the examples of the entire operation (for example, FIG. 5) of the O&M system 100, for example.

In the flowchart illustrated in FIG. 11, {y1, y2, y3} represents the observation events, and {θ1, θ2, θ3} represents the cause events to be estimated (occurrence event in FIG. 11).

When the O&M system 100 starts the process (S30), the O&M system 100 performs conditional determination (S31 to S33) and obtains each cause event {θ1, θ2, θ3} with respect to the observation events {y1, y2, y3}.

For example, the O&M system 100 determines whether an observation event y1 meets a condition (y1≤m) or not (S31). When the observation event y1 meets the condition, the O&M system 100 determines whether an observation event y2 meets a condition (y2≤n) or not (S32). The O&M system 100 performs the conditional determination with respect to all the observation events {y1, y2, y3, . . . } (or part of the observation events) and obtains the cause events {θ1, θ2, θ3, . . . }.

For example, the example of the flowchart illustrated in FIG. 11 represents the example of the estimating process of the cause event in a decision format, for example, and it is described below based on the specific example in the section "<5.2 Example of estimating process of cause event in decision format>".

<2. Example of Observation Event and Example of Cause Event>

A table illustrated in FIG. 12 represents an example of the observation event collected by the O&M system 100. FIG. 12 represents the example of the observation event, in which "self cell traffic" is "high", and "another cell traffic" is "low", and "Call Drop (call disconnection)" is "low", and "another cell radio link-failure (RL-F)" is "high".

An expedient expression such as "high" and "low" is used in the table, however, a specific numerical value may be applied in place of the expression such as "high" and "low". For example, the O&M system 100 may collect the numerical value regarding the observation event observed in the base station, and so on, compare the numerical value with threshold value, and obtain the observation result such as "high" and "low". Or, the O&M system 100 may compare the specific value observed in the base station with the threshold value in the base station, and obtain the observation result such as "high" and "low" by collecting the comparison result from the base station.

There is "load in a self-cell is higher than a threshold value, and quality is not satisfactory on uplink side, so that "reject" occurs", as specific event (or observation event) illustrated in FIG. 12, for example. The occurrence of this event leads to acquisition of the observation event illustrated in FIG. 12.

In the case illustrated in FIG. 12, the cause of the occurrence of the observation event is as follows, for example.

1) Excessive load occurs.
2) Handover area is larger than threshold value.
3) Excessive radio wave is received from the terminal 200 located in the area of the another cell (or another base station).
4) There exists an error in the setting of the various system parameter.
5) Others.

1) to 5) are likely to lead to the cause event with respect to the observation event illustrated in FIG. 12. The cause event is a single cause or a plurality of causes described above, for example. The O&M system 100 performs the estimating process of the cause event, thereby estimating 1) to 5) as the cause event with respect to the observation event illustrated in FIG. 12.

In the example of the operation described later, the concrete example of the observation event and the cause event are described. These examples will be described on each occasion.

<3. Example of Processes in the O&M System 100>

Figure 13:
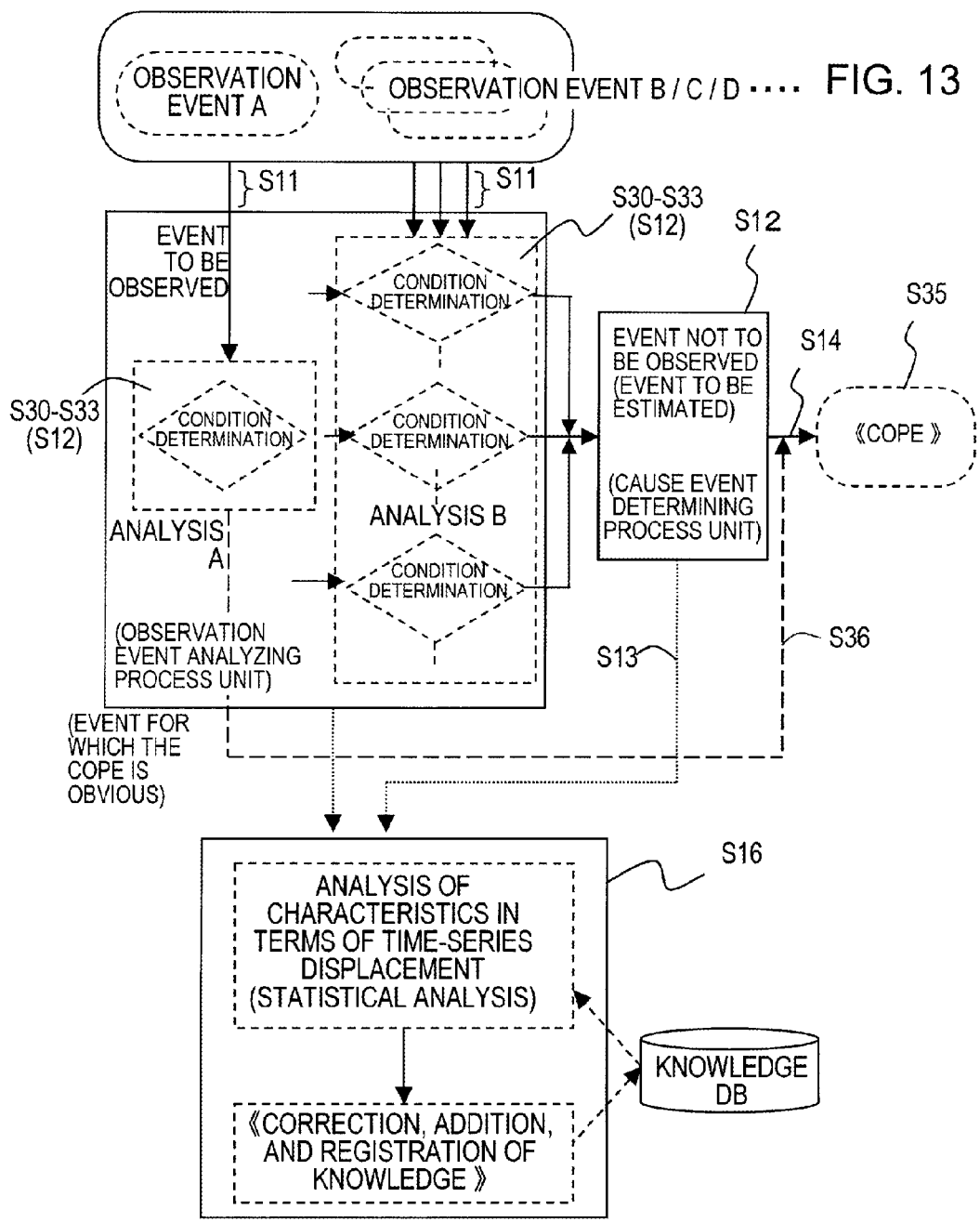
FIG. 13 is a flowchart illustrating an example of processes in the O&M system.

FIG. 13 is a diagram illustrating an example of processes in the O&M system 100. The diagram illustrated in FIG. 13 represents the example of the entire process of the O&M system 100, for example. In FIG. 13, the same reference numeral is designated to the process same as the process illustrated in FIGS. 5 and 11.

For example, when the O&M system 100 obtains the observation events B, C, and D, the O&M system 100 performs the conditional determination (S30 to S33) and analyzes the observation events B, C, and D. For example, the conditional determination can be performed in the observation event analyzing process unit 122 (for example, FIG. 4).

Based on the conditional determination, the O&M system 100 determines the cause event (S12). For example, the determination of the cause event can be performed in the cause event determining process unit 131 (for example, FIG. 4).

In addition, the O&M system 100 determines whether the cause event is registered in the knowledge DB 140 or not (S13). When the cause event is registered in the knowledge DB 140, the O&M system 100 notifies the cause event to the operator (S14). In this case, the O&M system 100 determines the coping method indicating how the estimated cause event is coped with, thereby providing the operator with determined the coping method (S35). For example, determination and provision of the coping method can be performed by the cause event determining process unit 131 and the knowledge registering process unit 142.

For example, data indicating the coping method is registered in the knowledge DB 140, and the O&M system 100 reads out the data indicating coping method from the knowledge DB 140 and outputs the data to the monitor 186, thereby providing the coping method for the operator or surveillant. Hereinafter, this operation in the O&M system 100 is referred to as "an operation in which the O&M system 100 provides the coping method", and the coping method and the data indicating coping method may be merely referred to as "coping method" not so as to be distinguished, for example.

On the other hand, the O&M system 100 extracts the distinctive factor from the time-series displacement with regards to the observation event and cause event, and registers the distinctive factor in the knowledge DB 140 (S16).

The observation events B, C, and D may be considered to be obtained from three base station (cell, or the like) or the observation events B, C, and D may be considered to be obtained from two base stations or more.

Regarding the observation event, the distinct coping method can be provided for some observation event. For example, when the conditional determination is fulfilled for the observation event A, the O&M system 100 determines the coping method without estimating the cause event with respect to the observation event A, and provides the coping method for the operator (S36). The observation event A is limited to certain one base station (or cell), and another base station (or cell) is not affected by the observation event A, for example.

For example, when concert is held in a certain area, there is a case where "Call Drop ratio" as the observation event changes only in the area. In this case, the O&M system 100 can affirmatively provide the coping method (for example, call is limited).

FIG. 14 illustrates an example of the observation events. FIG. 14 illustrates the example in which the observation event is classified into "classification" and "apparatus, location, and so on to be observed". For example, "classification" is exemplified by "quality state" and "call connection state". For example, there is "UP LINK" and "Adaptive Multi Rate (AMR) as an example of "apparatus to be observed, observation location, or the like. For example, the observation event can be classified by "quality state" and "UP LINK".

Such classification regarding the observation event is one example, and other classifying method may be applied. However, the operation of the O&M system 100 is not affected by the difference between the classifying method of the observation event.

<4. Example of Process in Case where Observation Event is "Connection Ratio Reduction">

Next, the specific example of processes will be described based on the example of "connection ratio reduction" as the observation event. FIG. 15 is a flowchart illustrating the example of the case where the observation event is "connection ratio reduction".

There is "Radio Resource Control (RRC) connection ration reduction" indicating the connection ratio of the mobile information terminal 200 to the base station on an RRC protocol level, "Multi RAB connection ration reduction" indicating the connection ratio of the mobile information terminal 200 in radio bearer to the base station, and so on, as the example of the observation event regarding "connection ratio reduction", for example.

For example, "connection ratio reduction" in the radio communication system is actually such that several hundreds of the observation events are integrated and represented as "connection ratio reduction". FIG. 16 illustrates an example of each observation event as "connection ratio reduction".

For example, the O&M system 100 can obtain the observation event regarding the connection ratio reduction from the base station and so on, and when obtains the observation event, the O&M system 100 performs the conditional determination illustrated in FIG. 15 (S41 to S47) and estimates the cause event (S50 and S52).

For example, as to the process of determining the cause event, the O&M system 100 holds information on what order to determine the observation event or holds the flowchart itself illustrated in FIG. 15. And, the O&M system 100 performs the conditional determination in accordance with the order of the obtained observation event or in accordance with the flowchart illustrated in FIG. 15 (S41 to S47), and estimates the cause event (S50 and S52), for example.

Similarly, the O&M system 100 holds the cause event and coping scenario illustrated in FIG. 15 in the memory and so on (for example, the knowledge DB 140), and the O&M system 100 can estimate the cause event (S50 and S52) and determines the coping scenario (S51 and S53).

For example, when the cause event is identified, the coping method is also identified. Accordingly, in the example in FIG. 15, the coping method is "coping scenario A" when the cause event is "observation analysis A" (S50 and S51), and the coping method is "coping scenario B" when the cause event is "observation analysis B" (S50 and S53).

In FIG. 15, for example, the processes from S41 to S47 can be carried out by the observation event analyzing process unit 122, and the process in S50 and S52 can be performed by the cause event determining process unit 131, and the processes in S51 and S53 can be performed by the knowledge registering process unit 142 and the cause event determining process unit 131.

Of these processes, the presentation of the coping method (S51 and S53) can be executed in a manner that the cause event determining process unit 131 accesses the knowledge DB 140 via the knowledge registering process unit 142 and reads out the coping method corresponding to the cause event from the knowledge DB 140.

<5. Example of Estimating Process of Cause Event>

An example of the estimating process of the cause event is described, for example, referring to FIG. 15, however, another estimating process will be described together with the example of the estimating process of the cause event in this section.

<5.1 Example of Estimating Process of Cause Event in Tabular Format>

There is an example of the estimating process by a table (or tabular) format as the example of the estimating process of the cause event includes, for example. FIG. 18 illustrates an example of the table applied in the O&M system 100, and FIG. 17 illustrates an example of the cause event.

In FIG. 18, "self cell traffic", "another cell traffic", "Call Drop", and "another cell RL-F" represent the item of the observation event, for example. In addition, "analysis result No" represents a corresponding cause event number, for example. In the table illustrated in FIG. 18, a specific number of the "analysis result No" is obtained based on the combination of the observation result (or observation event) such as "high", "low", or the like in the items of the observation event.

For example, when "self cell traffic", "another cell traffic", "Call Drop", and "another cell RL-F" are "high", "high", "low", and "high" respectively, "11" is selected as "analysis result No". Further, when "self cell traffic", "another cell traffic", "Call Drop", and "another cell RL-F" are "high", "low", "low", and "high" respectively, "13" is selected as "analysis result No".

For example, when "analysis result No" is "11", the cause event corresponds to "load is concentrating" illustrated in FIG. 17, and when "analysis result No" is "13", the cause event corresponds to "interference waves exist".

Accordingly, the O&M system 100 holds the table illustrated in FIG. 18 and information associated with the cause event illustrated in FIG. 17 in the memory (for example, the knowledge DB 140) and obtains "analysis result No" with respect to the observation event obtained from the table. And, the O&M system 100 reads out the cause event corresponding to "analysis result No" so as to estimate the cause event. For example, "analysis result No" and the cause event are held in the memory, and "analysis result No" and the cause event are correspondingly held, thereby the O&M system 100 can identify the cause event based on "analysis result No".

The table illustrated in FIG. 17 and the cause event illustrated in FIG. 18 are one example, and another table can be applied for the execution. Further, one or more of the cause event may be identified from "analysis result No" as the cause event. For example, "analysis result No" is stored in the memory in such a manner that a plurality of the cause events corresponds to "analysis result No", and when a one of "analysis result No" is obtained, the plurality of cause events can be identified.

In the example of the cause event illustrated in FIG. 17, the cause event can be classified into "classification" and "apparatus, location, and so on to bring about the cause". For example, there is "threshold value is too low or high" as the cause event regarding "handover". This classification is one example, and the estimating process of the cause event is not affected by the difference in the classifications.

FIGS. 19A and 19B illustrate the examples of a table. In examples illustrated in FIGS. 19A and 19B, there are "self cell traffic", "another cell traffic", and "Hand Over (HO) ratio" as the items of the observation, and "condition" ("analysis result No" in the example of FIG. 18) is selected in accordance with these observation results. Similar to the example illustrated in FIG. 18, one or more corresponding cause events are selected in accordance with the selected condition.

<5.2 Example of Estimating Process of Cause Event in Decision Format>

Figure 20:
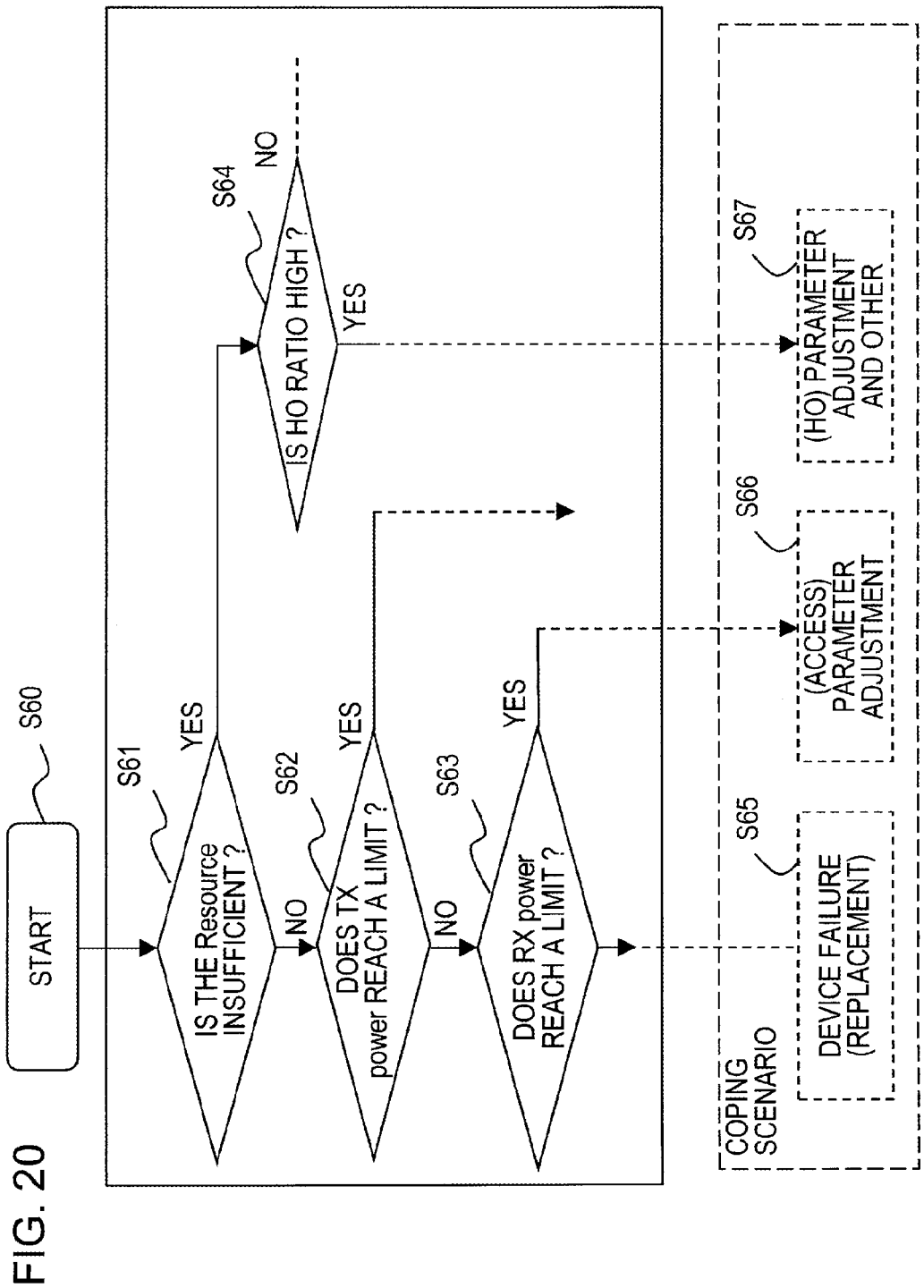
FIG. 20 is a flowchart illustrating an example of estimating the cause event.

FIG. 20 is a flowchart illustrating an example of the estimating process of the cause event. The estimating process of the cause event based on a decision format is an estimating process of the cause event by the flowchart illustrated in FIG. 20, for example. For example, FIGS. 11 and 15 illustrate examples of the estimating process of the cause event by the decision format.

In FIG. 20, there are "Resource" regarding radio resource applied for radio communication between the base station and the mobile information terminal 200, "TX power" and "RX power" regarding transmission power and reception power of the base station, and so on as the item of the observation event.

For example, the O&M system 100 determines whether "Resource shortage" of the observation event is obtained or not (S61), when the value of "Resource" obtained from the base station is lower than a threshold value. In addition, the O&M system 100 determines whether "TX power reaches the limits" of the observation event is obtained or not (S62), when the value of "TX power" obtained from the base station is interposed between the threshold value and a limited value. The O&M system 100 performs these determinations with respect to the observation events one by one (S61 to S64), thereby estimates the cause event.

For example, in a case where there occurs a traffic state having a value higher than the threshold value, and there exists an area (or cell, or base station) that does not satisfy Quality of Service/Grade of Service (QoS/GoS), the observation events described above are obtained. FIG. 20 illustrates the example of the estimating process of the cause event in the case above.

In the example illustrated in FIG. 20, for example, the O&M system 100 holds the order of determinations of the observation events in the memory and so on, and determines the obtained observation event one by one in accordance with the order, thereby estimates the cause event.

In FIG. 20, the determination of the cause event is omitted, however, the determination of the cause event is actually performed prior to the coping scenario (S65, S66, and S67).

There are "instrument failure (replacement)" (S65), "(access) parameter adjustment" (S66), "(HO) parameter adjustment, and so on" (S67), and so on as the example of the coping scenario (or coping method).

For example, "instrument failure (replacement)" represents the coping scenario indicating that failure occurs in instrument of the base station, and the instrument needs to be replaced. In addition, "(access) parameter adjustment" represents the coping scenario indicating that parameters applied for the radio communication between the base station and the mobile information terminal 200 is adjusted, for example. Further, "(HO) parameter adjustment and so on" represents the coping scenario indicating that parameter used in the base station is adjusted in handover of the mobile information terminal 200.

When the O&M system 100 estimate the cause event, the O&M system 100 selects the coping scenario described above and notifies the coping scenario to the operator. Accordingly, the O&M system 100 can notify to the operator and so on what cope can be applied to the information communication network system 10 and can support the operator in the decision-making.

The coping scenario illustrated in FIG. 20 represent the example in which one coping scenario corresponds to one cause event. Alternatively, two coping scenarios or more may be selected for one cause event.

<6. Example of Coping Method>

Next, the concrete example of the coping method (or coping scenario) will be described. FIG. 21 is a diagram illustrating example of the observation event, the cause event, and the coping method in the tabular format.

In the example illustrated in FIG. 21, two observation events are represented. That is, the example of the observation event is represented on the left side of FIG. 21, and the example of the observation event is represented on the right side of FIG. 21. The example of the observation event represented on the left side of FIG. 21 is an example in which the self cell traffic is "high", the another cell traffic is "high", and Call Drop ratio is "low". The example of the observation event represented on the right side of FIG. 21 is an example in which the self cell traffic is "high", the another cell traffic is "high", and Call Drop ratio is "high".

The difference between the two observation events lies in Call Drop ratio. As illustrated in FIG. 21, the event obtained from the two observation events is intensively represented as "self and another cells both have substantial loads, and the quality on UL side is not satisfactory, and Reject occurs.", which gives the expression that the difference between the observation events is not clear.

In this case, the O&M system 100 can estimate the cause events such as "parameter setting error", "HO area is too wide", "excessive radio waves are received from a another cell", "TX-system apparatus failure", "overload", and so on, with respect to the two observation events. These estimated cause events each serve as the same cause event with respect to the two observation events.

However, in response to the slight difference between observation events (difference in "Call Drop ratio" in the example of FIG. 21), the O&M system 100 can provide a different coping method. In the example of FIG. 21, the O&M system 100 provides the coping method including "Admission threshold value is raised" with respect to the observation event illustrated on the left side of the diagram and provides the coping method not including "Admission threshold value is raised" with respect to the observation event illustrated on the right side of the diagram.

Thus, the O&M system 100 can provide different coping methods in accordance with the slight difference between observation events. Accordingly, compared with the case where the coping methods are identical, the O&M system 100 can enhance accuracy in term of the provided coping method.

For example, the O&M system 100 holds the coping method in the memory (for example, the knowledge DB 140) and so on, reads out the coping method from the memory in accordance with the observation event, and outputs the coping method to the monitor 186 and so on, thereby provides the coping method for the operator.

The O&M system 100 stores the coping method as coping history in the knowledge DB 140. For example, the history is stored in the knowledge DB 140 in such ways that the observation event is improved as the result of cope by a certain coping method with respect to a certain cause event, or that the observation event does not be improved as the result of cope by another coping method. For example, the knowledge DB 140 can stores what improvement the O&M system 100 is achieved, by means of manipulation of the operator to the O&M system 100. In addition, the O&M system 100 can perform the process of providing the improved coping method, based on the history stored in the knowledge DB 140.

According to the presentation of the coping method, or the presentation of the coping method to be improved, the O&M system 100 can support the operator in decision-making with regard to the coping method and improvement measure to the information communication network system 10.

<7. Examples of Other Operation>

Next, an example of the other operation will be described. The example described above (for example, FIG. 15) includes the example of "connection ratio reduction" as the example of the observation event.

Figure 22:
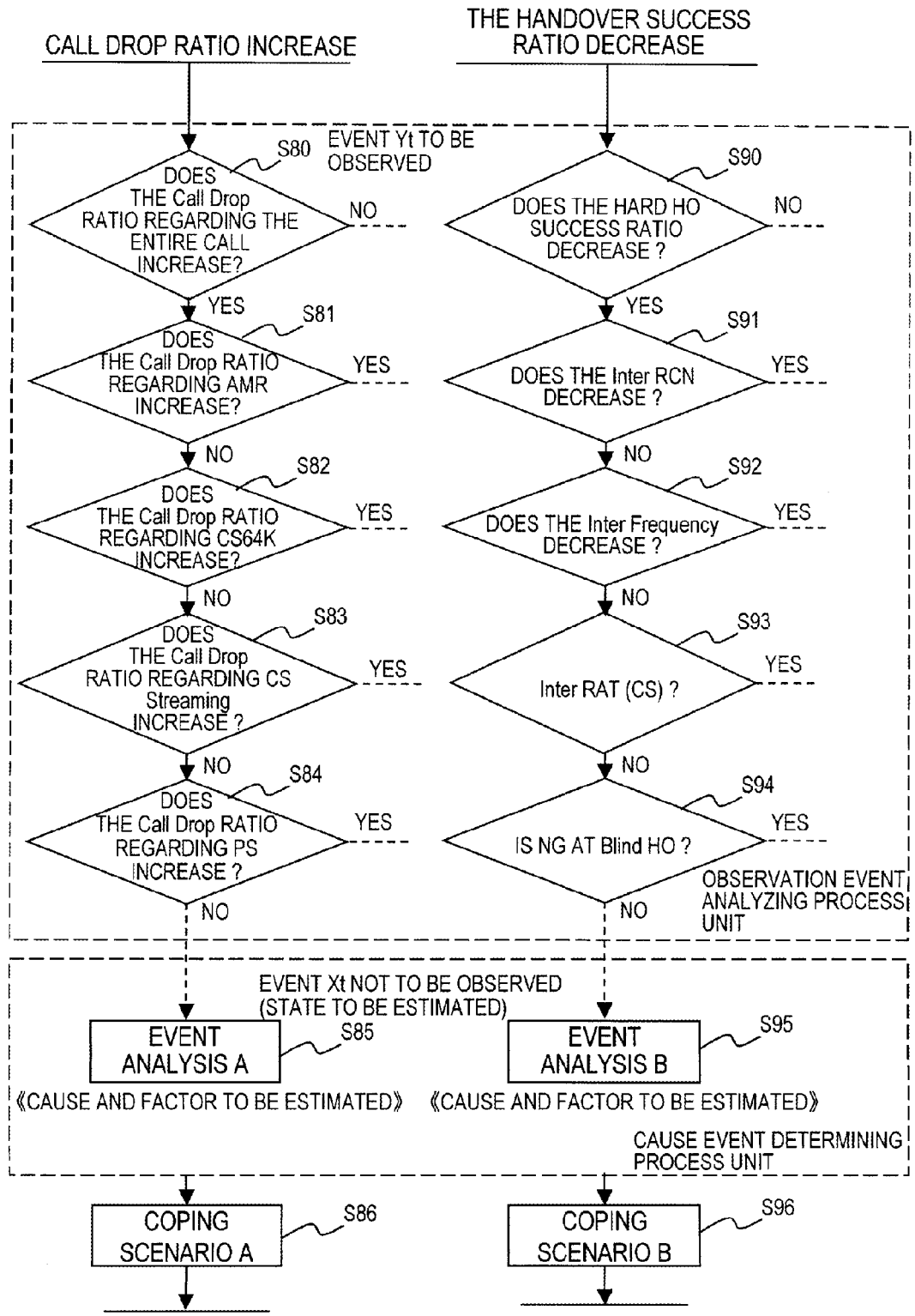
FIG. 22 is a flowchart illustrating an example of process in the O&M system.

FIG. 22 illustrates an example of the estimating process of the cause event in a case where "Call Drop ratio increase" and "handover success ratio reduction" are exemplified as the observation event. The subject of the observation event is changed from "connection ratio reduction" to "Call Drop ratio increase" and "handover success ratio reduction", and the estimating processes of the cause event (S80 to S86 and S90 to S96) are carried out with respect to each observed observation event.

FIG. 22 illustrates the example of the estimating process of the cause event in the decision format. Alternatively, similar to FIG. 18, the cause event may be estimated based on the tabular format. In this case, for example, in the item of the observation event in FIG. 18, the observation events regarding "Call Drop ratio increase" and "handover success ratio reduction" ("entire Call Drop ratio increase" or "hard HO success ratio reduction" and so on) are stored. Similar to the example described above, the O&M system 100 selects "analysis result No" and identifies the cause event corresponding to "analysis result No" from the combination of the observation events, thereby estimates the cause event.

FIG. 23 is a diagram illustrating the specific example of the observation event regarding "Call Drop ratio increase" and "handover success ratio reduction".

For example, there are "total call drop ratio increase of Circuit Switching (CS)" representing the call drop ratio increase of the entire circuit switching call, "total call drop ratio increase of Packet Switching (PS)" representing the call drop ratio increase of the entire packet call, and so on, as "Call Drop ratio increase".

For example, there are "success ratio reduction in the preparation phase of Hard Hand Over (HHO)", "success ratio reduction in the execution phase of HHO" respectively representing the success ratio reduction in the preparation phase and execution phase of handover, and so on, as "handover success ratio reduction".

The O&M system 100 estimates the cause event in the decision format (for example, FIG. 22) or the tabular format (for example, FIG. 18) based on such observation event.

<Detailed Example of Entire Operation of the O&M System 100>

Next, the detailed example of the operation of the O&M system 100 will be described. The example of the operation of the O&M system 100 is described in the section <Example of entire operation of the O&M System 100> described above. In this section, the detailed example of the operation of the O&M system 100 will be described. The same description will be partially made. However, the examples of the operation will be described en masse in this section.

FIGS. 24 and 25 are flowcharts illustrating the detailed example of the operation of the O&M system 100. In order to facilitate easy understanding, the flowcharts in FIGS. 24 and 25 include the configuration in the O&M system 100.

In FIG. 24, the O&M system 100 further includes an operation information reception process unit 161, an operation environment analyzing process unit 163, an observation subject system interface process unit 112, an observation event extracting process unit 123, a process subject observation event extracting process unit 124, a change state event detecting process unit 125, and an extract observation event renewal process unit 166.

Incidentally, the operation information reception process unit 161 and the operation environment analyzing process unit 163 correspond to the associated information receiving process unit 160 in the O&M system 100, illustrated in FIG. 4, for example. In addition, the observation subject system interface process unit 112 corresponds to the observation event receiving process unit 111 in the O&M system 100 illustrated in FIG. 4, for example.

In addition, the observation event extracting process unit 123 and the process subject observation event extracting process unit 124 correspond to the observation event extracting unit 121 in the O&M system 100 illustrated in FIG. 4, for example. Further, the change state event detecting process unit 125 corresponds to the observation event analyzing process unit 122 in the O&M system 100 illustrated in FIG. 4, for example. Further, the extract observation event renewal process unit 166 corresponds to the statistical analysis process unit 180 in the O&M system 100 illustrated in FIG. 4, for example.

In FIG. 24, the O&M system 100 further includes an operation information DB 162, an operation environment condition DB 164, an observation event DB 113, an extract observation event DB (t-time part) 167, an extract observation event DB (t−1 time part) 165, a process subject observation event DB 127, and a change state event DB 128. These DBs illustrated in FIG. 24 are stored in a memory such as a hard disk in the O&M system 100, for example.

The processes in FIG. 24 include a process of setting an environment condition to perform a screening with respect to the observation event (S101 to S104), a process of extracting the observation event that serves as a subject to be processed, by the screening the observation event based on the set environment conditions (S105 to S116), and a process of renewing the observation event (S117 to S119), for example.

First, the process of setting the environment condition (S101 to S104) will be described. The operator IF process unit 150 receives operation associated information including the event information and cell information (or associated information, and hereinafter, the associated information may be referred to as operation associated information) (S101).

The operation associated information includes the entertainment information, the cell information, and so on, for example. The event information includes information on date, place at which concerts or sport competitions are held, and so on, for example. The cell information includes information in which a certain base station is out of order, temporarily halted, or the like, for example. The event information and the cell information include regional condition, temporal condition such as date, times, season, and so on, condition such as meteorological feature, the operational state of the base station, or the like as described above, for example. For example, the operation associated information is input by the operator operating the O&M system 100 and so on.

When the operation information reception process unit 161 receives the operation associated information, the operation information reception process unit 161 stores the operation associated information in the operation information DB 162 (S102).

Next, the operation environment analyzing process unit 163 reads out the operation associated information from the operation information DB 162 and analyzes the operation associated information (S103). For example, the operation environment analyzing process unit 163 confirms what information the operation associated information includes, what condition the condition described above include, or the like. The operation environment analyzing process unit 163 stores the analyzed operation associated information in the operation environment condition DB 164 as the operation condition (S104), for example.

As described above, the operation condition is registered in the operation environment condition DB 164, and the O&M system 100 can perform the screening with respect to the observation event based on the registered operation condition.

Next, the process of the screening (S105 to S116) will be described. The observation subject system interface process unit 112 receives the observation event (S105). The observation events include several hundreds of types of the observation events (for example, "events to be observed" illustrated in FIG. 14), for example.

Next, the observation event receiving process unit 111 receives the observation event from the observation subject system interface process unit 112 and stores the received observation event in the observation event DB 113 (S106).

Next, the observation event extracting process unit 123 performs the screening (or filtering) with respect to the observation event read out from the observation event DB 113 based on the operation condition read out from the operation environment condition DB 164 (S107 and S108).

For example, the observation event extracting process unit 123 performs the process of removing the observation event that is clearly not considered as a subject based on the operational condition. For example, in a case where the event is held in a certain area, and the observation event indicating that the traffic is excessively high in the base station that covers the area is obtained, the observation event extracting process unit 123 determines that the observed observation event is not considered as a subject. In other case where a certain base station is halted, and the observation event indicating that HO ratio represents an excessively high value in the adjacent base station is obtained, the observation event extracting process unit 123 determines that the observed observation event is not considered as the subject.

For example, the observation event extracting process unit 123 performs the screening in such a manner as to remove the observation event, which is not considered as the subject, from the observed subject. The observation event extracting process unit 123 can perform the screening, for example, by extracting the observation event corresponding to the operation condition. The observation event extracting process unit 123 stores the screened observation event in the extract observation event DB (t-time part) 167 (S109).

Next, the process subject observation event extracting process unit 124 performs the screening (or filtering) of the observation event to be processed, based on the latest observation event (time t) read out from the extract observation event DB (t-time part) 167 and the previous observation event (time t−1) read out from the extract observation event DB (t−1 time part) 165 (S110 and S111).

For example, the process subject observation event extracting process unit 124 performs the screening in a manner as to extract the observation event in which temporal change (or time-series change) occurs. The process subject observation event extracting process unit 124 extracts the observation event having the significance as the subject to be processed, for example.

The observation event extracting process unit 123 described above performs primary screening in a manner as to remove the observation event that is obviously considered not to be the subject, for example. The process subject observation event extracting process unit 124 performs secondary screening for the observation event after the primary screening, in a manner as to extract the observation event needed for time-series analysis, for example. For example, the process of extracting the observation event to be processed from several hundreds of the observation events is performed by the observation event extracting process unit 123 and the process subject observation event extracting process unit 124.

Further, the observation event extracting process unit 123 or the process subject observation event extracting process unit 124 can receive the result of the narrowing process performed in the knowledge registering process unit 142 (for example, the observation event to be observed) and extract the observation event, for example. The detail of the process will be described below.

The process subject observation event extracting process unit 124 stores the extracted observation event in the process subject observation event DB 127 (S112).

Next, the change state event detecting process unit 125 detects the observation event to be recognized as the state event change with respect to the observation events read out from the process subject observation event DB 127, based on the past observation event read out from the knowledge DB 140 (S113 and S114).

For example, the change state event detecting process unit 125 reads out the observation event identical to the observation event to be processed from the knowledge DB 140, and when the observation event to be processed is different from the observation event read out from the knowledge DB 140, the change state event detecting process unit 125 can detect that the observation event to be processed is the observation event in which the state event is changed.

The change state event detecting process unit 125 stores the detected observation event in the change state event DB 128 (S115). The subsequent process is illustrated in FIG. 25.

Next, the renewing process of the detected observation event (S117 to S119) will be described. The extract observation event renewal process unit 166 performs the renewing process of the extracted observation event. That is, the extract observation event renewal process unit 166 reads out the latest observation event (t time) read out from the extract observation event DB (t-time part) 167 and the previous observation event (time t−1) read out from the extract observation event DB (t−1 time part) 165 (S117 and S118), for example. In addition, the extract observation event renewal process unit 166 updates the previous observation event read out, into the latest observation event and stores the latest observation event in the extract observation event DB (t-time part) 167 (S119).

The extract observation event renewal process unit 166 operates independently of the extracting process of the state change event and the determining process of the cause event (for example, FIG. 25) and ends the processes before receiving the observation event in the next circle, for example.

FIG. 25 is a flowchart illustrating the detailed example of the operation of the O&M system 100, leading from FIG. 24. In order to facilitate easy understanding, the flowchart in FIG. 25 represents a part of the configurations included in the O&M system 100.

Further, the O&M system 100 includes a knowledge information reception process unit 152, a knowledge renewal process unit 144, a cause determining process unit 132, a cause notifying process unit 133, an operator-or-external-output-apparatus interface unit 169, a cause analyzing process unit 168, an operation history reception process unit 170, and an operation history analyzing process unit 172.

Specifically, the knowledge information reception process unit 152 corresponds to the operator requirement receiving process unit 151 illustrated in FIG. 4, for example. The knowledge renewal process unit 144 corresponds to the knowledge addition/correction process unit 141 and the knowledge registering process unit 142, for example. Further, the cause determining process unit 132 corresponds to the cause event determining process unit 131 illustrated in FIG. 4, for example. Further, the cause notifying process unit 133 and the operator-or-external-output-apparatus interface unit 169 correspond to the display editing unit 184 illustrated in FIG. 4, for example. Further, the cause analyzing process unit 168 corresponds to the cope history process unit 182 illustrated in FIG. 4, for example. Further, the operation history reception process unit 170 and the operation history analyzing process unit 172 correspond to the operator requirement receiving process unit 151 illustrated in FIG. 4, for example.

Further, the O&M system 100 includes a knowledge information DB 153, a state event change cause DB 134, a notice log DB 135, an operation history DB 171, and a history analyzing DB 173. For example, these DBs illustrated in FIG. 25 can be stored in the memory such as a hard disk and so on in the O&M system 100.

The processes in FIG. 25 include a registering process of adding new item or deleting the item to/in the knowledge DB 140 (S125 to S129), an estimating process of the cause event (S130 to S132), and a registering process of the operations of the operator in the knowledge DB 140 (S140 to S147), for example.

First, the registering process for the knowledge DB 140 (S125 to S129) will be described. The operator IF process unit 150 receives the knowledge information (S125). The knowledge information includes the observation event (observation items) stored in the knowledge DB 140 and the determination condition such as a threshold value in a case where the self-cell traffic is determined "high" with respect to the observation event, for example. In addition, the knowledge information includes a table (or the observation events included in the table) illustrated in FIG. 18 and flowcharts (or what order the processes regarding the observation events are carried out) illustrated in FIGS. 11 and 15. Alternatively, the knowledge information may include item specified as know-how the operator or the cause event.

Such knowledge information can be input by the operator in the O&M system 100. The item and event in accordance with the intention of the operator can be registered in the knowledge DB 140. Accordingly, for example, the table illustrated in FIG. 18 and the flowcharts illustrated in FIGS. 11 and 15 can be registered in the knowledge DB 140. The knowledge DB 140 is exemplified by the table illustrated in FIG. 18 and the flowcharts illustrated in FIGS. 11 and 15, for example.

Next, the knowledge information reception process unit 152 receives the knowledge information via the operator IF process unit 150 and stores the knowledge information in the knowledge information DB 153 (S126).

Next, the knowledge renewal process unit 144 reads out the knowledge information from the knowledge information DB 153 classifies, for example, the knowledge information in units of apparatuses or devices, and stores the knowledge information in the knowledge DB 140 (S127 to S129). In this case, the knowledge renewal process unit 144 reads out the observation event to be incorporated as new knowledge, which is the observation item, the observation data, and so on, from the process subject observation event DB 127 and stores the observation event to be incorporated, in the knowledge DB 140, thereby renewing the observation event as new knowledge, for example.

Next, the estimating process of the cause event (S130 to S132) will be described. The cause determining process unit 132 reads out the observation event from the change state event DB 128 and estimates the cause event based on the knowledge DB 140 (S130 and S131). For example, the estimating process according to the table described in the section <5.1 Example of estimating process of cause event in tabular format> may be applied for the estimation of the cause event, or the estimating process according to the flowchart described in the section <5.2 Example of estimating process of cause event in decision format> may be applied for the estimation of the cause event. The detailed description of the estimating process has already been made, and the description is omitted herein. The cause determining process unit 132 stores the estimated cause event in the state event change cause DB 134 (S132).

Next, the cause communication process unit 133 outputs the cause event read out from the state event change cause DB 134 to the monitor 186 via the operator-or-external-output-apparatus interface unit 169, thereby notifying the operator operating the O&M system 100 of the cause event (S133 and S136).

In addition, the cause communication process unit 133 may store the cause event being notified to the operator in the notice log DB 135 (S135).

Next, the registering process of the operations of the operator (S140 to S147) will be described. The operator IF process unit 150 receives the operations carried by the operator (S140). The operations represent what cope the operator has provided for the cause event, for example. For example, in the example of FIG. 21, when "Admission threshold value is raised" as the cope is provided, the input command indicating that this cope is provided represents the operation. For example, the operation also represents the history of several manipulations in the course of input command, and so on.

Next, the operation history reception process unit 170 receives the operation by the operator via the operator IF process unit 150 and stores the operation in the operation history DB 171 as operation history (S141).

Next, the operation history analyzing process unit 172 extracts the operation history regarding the observation event to be processed from the operation history stored in the operation history DB 171 and stores the extraction result in the history analyzing DB 173 (S143), for example. Or, for example, the operation history analyzing process unit 172 may be configured to store the operation history, which is stored in the operation history DB 171, in the history analyzing DB 173.

The cause analyzing process unit 168 analyzes element to be reflected or utilized as the knowledge, with respect to the cause event stored in the state event change cause DB 134, and stores the analysis result in the knowledge DB 140 (S145 to S147). For example, the cause analyzing process unit 168 performs the register processes regarding "what cause event to estimate with respect to the observation event to be obtained", and "what operation to carry out with respect to the cause event to be estimated", in the knowledge DB 140. Accordingly, the cause analyzing process unit 168 reads out the observation event from the process subject observation event DB 127 (S145), reads out the operation history from the history analyzing DB 173 (S144), and reads out the cause event from the state event change cause DB 134 (S146). And, the cause analyzing process unit 168 correlates and stores the observation event, the operation history, and the cause event in the knowledge DB 140 (S147).

<Narrowing Process for Observation Event>

Next, the narrowing process for the observation events will be described. The narrowing process for the observation events is a process of determining the observation event to be observed from the plurality of observation events, for example. For example, the narrowing process of the observation event makes it easy to identify the cause event and refine the cause event, and further makes it possible to facilitate the extracting process of the observation event or the entire processes.

In FIG. 4, for example, the knowledge registering process unit 142 performs the narrowing process, determines the observation event, and outputs the determination results to the observation event extracting unit 121, which allows the observation event extracting unit 121 to actually extract the observation event to be observed.

In FIG. 24, for example, the observation event determined by the knowledge registering process unit 142 is input to the observation event extracting process unit 123 or the process subject observation event extracting process unit 124, thereby extracting the observation event corresponding to the observed observation event, out of the collected observation events.

The estimating process of the cause event is considered as a process of extracting the corresponding cause event out of the cause events registered in the knowledge DB 140 with respect to the collected observation events (for example, FIG. 18), for example. That is, as illustrated in FIG. 6, it is conceivable that the estimating process of the cause event is a way to obtain a conditional probability P (X|Y) that any one of the cause events X={x1, x2 ... xj} is selected with respect to the observation events Yj={y1, y2, ... yj}.

FIGS. 26A to 26C represent the probability of the cause event in a case where the observation events H1 to H3 individually (independently) occur (or arise), for example.

For example, the observation event H1 is the observation event regarding the attribute of "traffic". The observation event included in the observation event H1 is exemplified by the observation events ("self cell traffic" is "high", and "another cell traffic" is "low", and so on) with respect to the items such as "self cell traffic" or "another cell traffic", for example. In addition, for example, the observation event H2 is the observation event regarding the attribute of "radio resource". The observation event H3 is the observation event regarding the attribute of "connection".

The O&M system 100 can estimate the cause event based on the plurality of observation events and based on the single observation event.

Herein, for example, in the system design regarding the mobile communication system, it is assumed that the observation events H1 to H3 respectively are attributed to two cause events C1 and C2, and the probability of being attributing to the cause event C1 and the probability of being attributing to the cause event C2 have been estimated with respect to the respective observation events H1 to H3.

Regarding the observation event H1, it is assumed that the estimation is made such that the probability of being attributing to the cause event C1 is "3/4", and the probability of being attributing to the cause event C2 is "1/4" (see, for example, FIG. 26A). Regarding the observation event H2, it is assumed that the estimation is made such that the probability of being attributing to the cause event C1 is "1/2", and the probability of being attributing to the cause event C2 is "1/2". Further, regarding the observation event H3, it is assumed that the estimation is made such that the probability of being attributing to the cause event C1 is "1/3", and the probability of being attributing to the cause event C2 is "2/3".

Next, it is assumed that the observation events H1 to H3 occur with a uniform probability as an initial condition when the observation events H1 to H3 simultaneously occur (or arise). That is, the formula (1) represents as follows.

$$P(H1)=P(H2)=P(H3)=1/3 \quad (1)$$

In this case, when it is assumed that the observation events H1 to H3 simultaneously occur, and the cause event C1 is estimated, the conditional probabilities P (H1|C1), P (H2|C1), and P (H3|C1) of being attributed to the cause event C with respect to the respective observation events H1 to H3 are respectively obtained as follows.

$$P(H1|C1)=\{(1/3)\times(3/4)\}/\{[1/3\times(3/4)]+[(1/3)\times(1/2)]+[(1/3)\times(1/3)]\}=9/19=0.47 \quad (2)$$

$$P(H2|C1)=\{(1/3)\times(1/2)\}/\{[(1/3)\times(1/2)]+[(1/3)\times(1/2)]+[(1/3)\times(1/3)]\}=6/19=0.32 \quad (3)$$

$$P(H3|C1)=\{(1/3)\times(1/3)\}/\{[(1/3)\times(3/4)]+[(1/3)\times(1/2)]+[(1/3)\times(1/3)]\}=4/19=0.21 \quad (4)$$

It is noted that the conditional probability P (H|C) may be referred to as the degree W of involvement in the cause event C with respect to the observation event H, for example.

According to the formulas (2) to (4), the observation events H1 to H3 simultaneously occur. When the simultaneous occurrence of the observation events H1 to H3 is attributed to the cause event C1, the observation event H1, out of the observation events H1 to H3, can be deemed to be the most probable observation event (or event having the highest degree W of involvement). Accordingly, the O&M system 100 can determine that an attention is paid to the observation event H1, out of the observation events H1 to H3.

For example, the knowledge DB 140 holds initial conditions (for example, formula (1)) and the probabilities of being attributed to the cause events C1 and C2 with respect to the observation events H1 to H3 (for example, the probabilities illustrated in FIGS. 26A to 26C). In addition, the knowledge registering process unit 142 reads out these values from the knowledge DB 140 and calculates the formulas (2) to (4) to be executed.

After that, the operation of the O&M system 100 is started, and when the O&M system 100 observes the simultaneous occurrence of the observation events H1 to H3, the knowledge registering process unit 142 calculates the conditional probability (or the degree W of involvement) as follows.

$$P(H1|C1)=\{(9/19)\times(3/4)\}/\{[(9/19)\times(3/4)]+[(6/19)\times(1/2)]+[(4/19)\times(1/3)]\}=81/133=0.61 \quad (5)$$

$$P(H2|C1)=36/133=0.27 \quad (6)$$

$$P(H3|C1)=16/133=0.12 \quad (7)$$

FIG. 27 illustrates the values of the degree W of involvement in the cause event C1 in the case where the O&M system 100 repeatedly observes the simultaneous occurrence of the observation events H1 to H3 (or the simultaneous occurrence of the observation events H1 to H3 is repeated). In FIG. 27, the degree W of involvement based on "initial (setting) conditions" is represented as the formula (1). In FIG. 27, the degree W of involvement on "first time" is represented as the formulas (2) to (4), and the degree W of involvement on "second time" is represented as the formulas (5) to (7). Further, in FIG. 27, the degree W of involvement is represented in the case where it is assumed that the simultaneous occurrence of the observation events H1 to H3 is repeated, and as for any of the observation events H1 to H3, the cause event C1 is estimated.

As illustrated in FIG. 27, as the number of times for the observation increases, the degree W of involvement in the cause event with respect to the observation event H1 increases comparison with the other observation events H2 and H3. For example, in the fifth time, the degree W of involvement in the cause event with respect to the observation event H1 reaches a value of approximately 90%. In this case, the O&M system 100 can determine that the observation event H1 is a subject to be observed. Here, even when the number of times for the observation is one time (for example, "second time" in FIG. 27), the O&M system 100 can determine that the observation event H1 is a subject to be observed, based on the formulas (5) to (7).

Thus, the O&M system 100 observes the observation event in time series. For example, when the observation events H1 to H3 simultaneously occur, the O&M system 100 can determine what observation event to select as the subject to be observed, based on the degree W of involvement. For example, the O&M system 100 can determine that the observation event H1 having the highest degree W of involvement is considered as the subject to be observed. In this case, the O&M system 100 can estimate that the probability of being attributed to the cause event C1 is high, compared with other cause event.

The degree W of involvement can be obtained as follows, regarding the case where it is assumed that the estimation is made such that the simultaneous occurrence is attributed to the cause event C2, based on the design condition and after-the-event analysis when the observation events H1 to H3 simultaneously occur.

$$P(H1|C2)=\{(1/3)\times(1/4)\}\times\{[(1/3)\times(1/4)]+[(1/3)\times(1/2)]+[(1/3)\times(2/3)]\}=3/17=0.18 \quad (8)$$

$$P(H2|C2)=\{(1/3)\times(2/3)\}\times\{[(1/3)\times(1/4)]+[(1/3)\times(1/2)]+[(1/3)\times(2/3)]\}=7/17=0.35 \quad (9)$$

$$P(H3|C2)=\{(1/3)\times(2/3)\}\times\{[(1/3)\times(1/4)]+[(1/3)\times(1/2)]+[(1/3)\times(2/3)]\}=8/17=0.47 \quad (10)$$

In this case, the observation event H3 is higher in the degree W of involvement than the other observation events H1 and H2, so that the O&M system 100 can determine that the observation event H3 is the subject to be observed.

Figure 28:
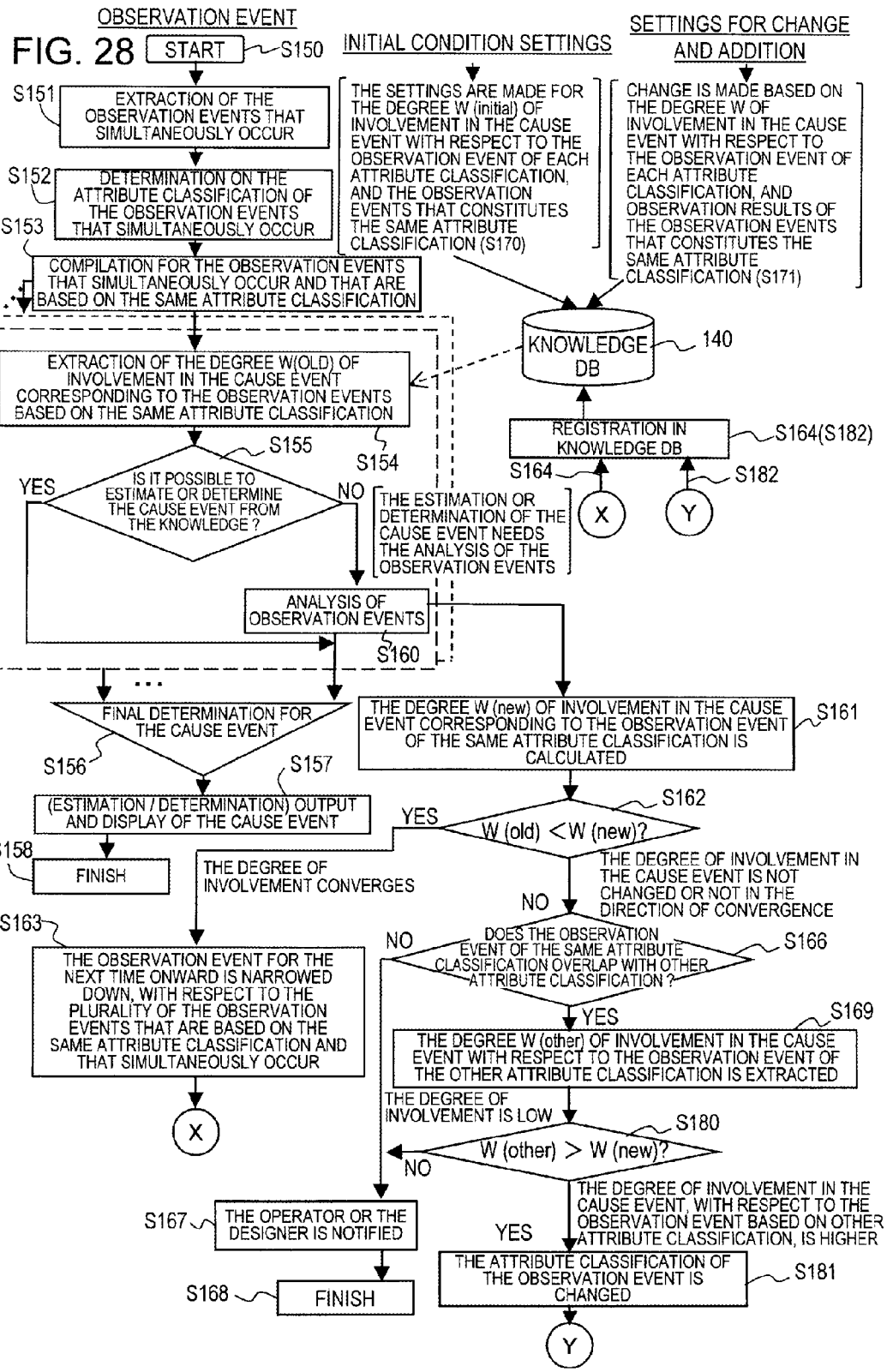
FIG. 28 is a flowchart illustrating an example of process to the degree of involvement.

FIG. 28 is a flowchart illustrating the example of the operation of the narrowing process in the O&M system 100. In FIG. 28, the operation described above is included in the example of operation in FIG. 28. The operation illustrated in FIG. 28 is carried out in the knowledge registering process unit 142, and may be carried out in the observation event extracting unit 121, other than the knowledge registering process unit 142, for example.

As the initial condition, the knowledge DB 140 stores an initial degree W of involvement and the observation event based on each attribute classification indicating what observation event and attribute to correlate with each other (S170).

The initial degree W of involvement represents the degree W of involvement that can be obtained through the observation of the observation event of "first time", for example. For example, in the example described above, the initial degree W of involvement is represented by the conditional probability obtained by the formulas (2) to (4).

The observation event based on the attribute classification is represented by the observation events H1 to H3 described above, for example. The knowledge DB 140 stores the observation events based on the attribute classification (for example, H1 and H2), for each of the attribute classifications, and the item of the observation event, which are included in the observation events based on the attribute classification (for example, "self cell traffic"), for example. The observation event based on the attribute classification registered in the knowledge DB 140 is registered in the knowledge DB 140 when the O&M system 100 is configured, in consideration of design conditions in the course of designing of the system, for example.

In the description below, in order to distinguish the observation events H1 to H3 with each observation event included in the observation events H1 to H3, for example, there is a case where the former (observation events H1 to H3) is referred to as "observation events based on the same attribute classification" or "observation events based on the attribute classification", and the latter (observation event included in the observation events H1 to H3) is merely referred to as "observation event". For example, the number of observation events included in the observation event H1 based on the same attribute classification may be single or plural.

On the other hand, the initialized degree W of involvement and the observation events based on the attribute classification can appropriately be changed or added in the O&M system 100 (S171).

The O&M system 100 can start the process on the assumption that the initialization is performed (S150).

When the O&M system 100 starts the process, the O&M system 100 extracts the observation event based the same attribute classification simultaneously occurring (S151).

For example, the knowledge DB 140 stores a plurality of observation events based on the same attribute classification and a flag indicating the observation events based on the same attribute classification simultaneously occurring. The knowledge registering process unit 142 reads out the observation events based on the same attribute classification and including a common flag, from the knowledge DB 140 and can extract the observation events H1 to H3 that are based on the same attribute classification and that simultaneously occur.

Next, the O&M system 100 determines the attribute classification of the observation events that simultaneously occur (S152) and compiles the observation events based on the same attribute classification that simultaneously occur (S153). For example, the knowledge registering process unit 142 determines whether there are other observation events that are based on the same attribute classification and that include the common flag or not. When there are other observation events, the knowledge registering process unit 142 allows the other observation events based on the same attribute classification to be included in the attribute indicated by the common flag. For example, the knowledge registering process unit 142 stores the observation events based on the same attribute classification after the compilation in the knowledge DB 140.

Next, the O&M system 100 performs the processes S154 to S155 and S160 for each of the observation event that is based on the same attribute classification and that simultaneously occur. For example, the O&M system 100 carries out the processes S154 to S155 and S160 for each of the observation events H1 to H3 based on the same attribute classification.

That is, the O&M system 100 extracts the degree W (old) of involvement in the cause event corresponding to the observation event based on the same attribute classification (S154). For example, the degree W of involvement for each flag is stored in the knowledge DB 140. The knowledge registering process unit 142 reads out the degree W of involvement regarding a certain flag from the knowledge DB 140 so as to extract the degree W (old) of involvement. For example, the knowledge registering process unit 142 reads out a value "9/19" in the formula (2) with regard to the observation event H1 as the degree (old) of involvement.

Next, the O&M system 100 determines whether the estimation (determination) of the cause event can be made based on the knowledge DB 140 or not (S155).

For example, there is a case where the cause event can affirmatively be determined with respect to the observation event based on a certain attribute classification. When the above-mentioned case is applied (S155, YES), the knowledge registering process unit 142 can determine the cause event, which is affirmatively determinable as a conclusive cause event (S156). As a determining method, for example, the knowledge registering process unit 142 accesses the knowledge DB 140, so that the determination can be made based on whether only one cause event with respect to the observation event based on the certain attribute classification is stored in the knowledge DB 140.

On the other hand, when the estimation of the cause event is not made based on the knowledge DB 140 (S155, NO), that is, when the O&M system 100 determines that the estimation of the cause event needs the analysis of the observation event, the O&M system 100 analyzes the observation event (S160).

For example, when the knowledge registering process unit 142 obtains the observation event based on a certain attribute classification in which the degree W of involvement converges, according to the process of S162 at a subsequent stage (S162, YES), such an observation event based on the certain attribute classification can be deemed as the subject to be observed. Accordingly, the knowledge registering process unit 142 confirms whether the observation event based on the certain attribute classification is obtained or not, thereby analyzing the present process, for example. It is noted that the detail of the process of S162 is described below.

When the O&M system 100 can estimate the cause event based on the knowledge DB 140 (S155, YES), or when the O&M system 100 obtains the observation event based on the attribute classification, in which the degree W of involvement converges (S160), the O&M system 100 determines the conclusive cause event (S156).

For example, when the process goes to YES in S155, the knowledge registering process unit 142 reads out the cause event from the knowledge DB 140 and outputs the cause event to the cause event determining process unit 131. In this case, the cause event determining process unit 131 outputs the cause event to the monitor 186 so as to display the cause event (S157).

In addition, the O&M system 100 ends a series of processes (S158).

On the other hand, for example, when the O&M system 100 does not obtain the observation event based on the attribute classification in which the degree W of involvement to be converged (S160), the O&M system 100 newly calculates a degree W (new) of involvement in the cause event corresponding to the observation event based on the same attribute classification (S161).

For example, when the observation event extracting process unit 123 obtains the observation event based on the attribute classification of the next circle, the observation event extracting process unit 123 outputs the observation event to the knowledge registering process unit 142, and the knowledge registering process unit 142 obtains a new degree W (New) of involvement with respect to the obtained observation event based on the attribute classification of the next circle. For example, the knowledge registering process unit 142 calculates each value of the formulas (5) to (7) as the degree W (New) of involvement.

Next, the O&M system 100 determines whether W (old) <W (new) is satisfied or not (S162). That is, the O&M system 100 determines whether the degree W of involvement converges or not.

For example, a value "81/133" in the formula (5) is higher than a value "9/19" in the formula (2), which meets W (old) <W (new). In addition, a value "36/133" in the formula (6) is lower than a value "6/19" in the formula (3), which fails to meet W (old)<W (new).

For example, when any one of the plurality of the observation events H1 to H3 that are based on the same attribute classification and that simultaneously occur meets W (old) <W (new) (S162, YES), the knowledge registering process unit 142 determines that the degree W of involvement converges. In addition, the plurality of the observation events H1 to H3 that are based on the same attribute classification and that simultaneously occur all fail to meet W (old)<W (new) (S162, NO), the knowledge registering process unit 142 determines that the degree W of involvement does not converge.

When the O&M system 100 determines that the degree W of involvement converges (S162, YES), the O&M system 100 deems the observation events based on the same attribute classification as the observation event for the next time onward (S163).

For example, the O&M system 100 selects the observation event H1 based on the same attribute classification, in which the degree W of involvement converges, as the subject to be observed, out of the plurality of the observation events H1 to H3 that are based on the same attribute classification and that simultaneously occur. For example, based on this selection, the O&M system 100 narrows down the plurality of the observation events H1 to H3 that are based on the same attribute classification and that simultaneously occur, into the observation event H1 based on the same attribute classification, which is the subject to be observed, thereby the observation can be performed.

Accordingly, in the condition where hundreds and thousands of observation events are observed, the O&M system 100 does not estimate the cause event based on all the observation events that is observed, but estimates the cause event based on the observation event regarding the narrowed attribute classification (for example, the observation event H1 based on the same attribute classification). Consequently, the O&M system 100 can estimate or determine the cause event from a huge mass of observation events. The O&M system 100 estimates the cause event based on the observation event regarding the narrowed attribute classification, so that the O&M system 100 can refine the observation event to be observed and facilitate the processing speed, compared with the case where the cause event is estimated based on all the observation events.

Returning to FIG. 28, subsequently, the O&M system 100 stores the narrowed observation event and the degree W (new) of involvement in the knowledge DB 140 (S164). For example, when the degree W (new) of involvement stored in the knowledge DB 140 is read out by the knowledge registering process unit 142, the degree W (new) of involvement is turned into the degree W (old) of involvement, and the process of S154 is carried out.

On the other hand, when the degree W of involvement does not converge (S162, NO), the O&M system 100 determines whether the observation events based on the same attribute classification are overlapped with the observation events based on another attribute classification, or not (S166). This overlap will be described below.

Figure 29:
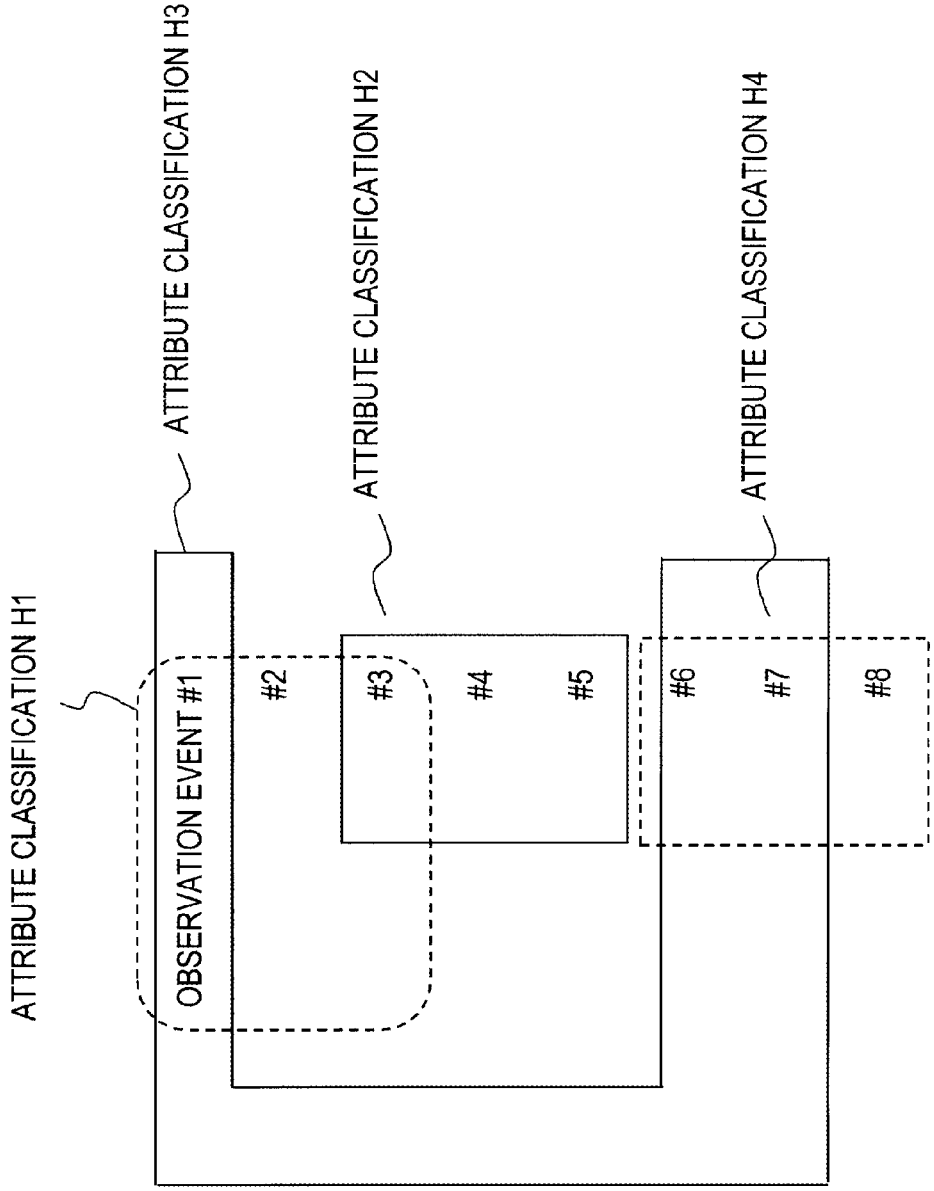
FIG. 29 is a diagram illustrating an example of the observation event based on same attribute classification.

FIG. 29 illustrates an example of the observation event based on the same attribute classification. In the example of FIG. 29, another attribute classification H4 is illustrated in addition to the attribute classification H1 to H3. The observation events #6 and #7 belong to both attribute classifications H3 and H4. For example, when the attribute classifications H3 is exemplified by "connection", and the attribute classifications H4 is exemplified by "quality states", and the observation events #6 and #7 belong to both of the attribute classifications H3 and H4. As described above, it is assumed that the correlation of the observation event with the attribute classification is stored in the knowledge DB 140, for example, in the course of designing of the system.

In the process of S166 in FIG. 28, when the degree W of involvement does not converge, the O&M system 100 determines that there is a problem in the combination of the three attribute classification H1 to H3 and further determines whether the observation events of another attribute classification H4 is added or not, for example. For example, the knowledge registering process unit 142 determines whether the observation events H1 to H3 based on the original attribute classification are overlapped with the observation event of another attribute classification H4 or not, thereby carrying out the process.

Returning to FIG. 28, when the observation event based on the certain attribute classification do not be overlapped with the observation event based on another attribute classification (S116, NO), the O&M system 100 notifies the operator or the designer of the absence of the overlap (S167).

For example, the knowledge registering process unit 142 notifies the cause event determining process unit 131, and so on of the content in which there is a problem in the combination of the observation event that simultaneously occur and constitute the three attribute classification H1 to H3, and the content is displayed on the monitor 186, thereby notifying the operator or the designer of the content. Accordingly, for example, the O&M system 100 can urge the operator or the designer to reconsider the design condition, and so on. For example, the operator or the designer changes the attribute classifications with respect to the observation event that is based on the attribute classifications H1 to H3 and that simultaneously occur, and the observation event that is based on the attribute classification after the change are stored in the knowledge DB 140 (S171).

Next, a series of processes ends (S168).

On the other hand, when the observation event based on the same attribute classification is overlapped with the observation event based on another attribute classification (S166, YES), the O&M system 100 calculates the degree W (other) of involvement in the cause event with respect to the observation event based on another attribute classification (S169). For example, the knowledge registering process unit 142 calculates the degree W of involvement in the cause event (for example, cause events C1 or C2) with respect to the observation event H4 based on another attribute classification.

Next, the O&M system 100 determines whether W (other) >W (new) is satisfied (S180). That is, the O&M system 100 compares the highest degree W (new) of involvement, out of the respective degrees of involvement in the cause event C1 with respect to the observation events H1 to H3 based on the attribute classification, with the degree W (other) of involvement in the cause event C1 with respect to the observation event H4 based on another attribute classification, so as to perform the determination, for example.

When the degree W (other) of involvement in not higher than the degree W (new) of involvement (S180, NO), the degree W (other) of involvement in the cause event with respect to the observation event based on another attribute classification is lower than the degree W (new) of involvement that does not converged. In this case, even when the observation event based on another attribute classification is included in the observation event based on the certain attribute classification, the degree W (new) of involvement does not converge, so that the O&M system 100 notifies the manager or the designer of the content in which there is a problem in the combination of the observation events based on the attribute classification (S167).

On the other hand, when the degree W (other) of involvement in the cause event with respect to the observation event based on another attribute classification is higher than the degree W (new) of involvement in cause event with respect to the observation event based on the attribute classification (S180, YES), the O&M system 100 changes the attribute classification (S181).

For example, the knowledge registering process unit 142 changes the attribute classifications in a manner that the observation events H3, out of the observation events H1 to H3 based on the attribute classification, is replaced with the observation events H4, or in a manner that that the observation events H4 is added to the observation events H1 to H3, which is represented as the observation events H1 to H4 based on the attribute classification. It is noted that the knowledge registering process unit 142 calculates the degree of involvement in the cause event with respect to the observation events based on the attribute classification after the change and stores the degree of involvement in the knowledge DB 140, for example.

Next, the O&M system 100 stores the attribute classification after the change in the knowledge DB 140 (S182). Henceforth, the O&M system 100 repeats the process (for example, S154) of extracting the degree W of involvement in the cause event with respect to the observation events based on the attribute classification after the change, from the knowledge DB 140.

That is, the O&M system 100 stores the calculated degree W (other) of involvement in the knowledge DB 140 (S182), for example. In addition, the O&M system 100 reads out the values regarding the formula (1) and the formulas (2) to (4) with respect to the observation events based on the attribute classification after the change, from the knowledge DB 140 and calculates the degree W of involvement (formulas (5) to (7) and formulas (8) to (10)) (S161). In addition, the O&M system 100 calculates the degree W (new) of involvement (S162). When the calculated degree W (new) of involvement converges (S162, YES), the O&M system 100 narrows down the observation data, with respect to the observation events based on the attribute classification (S163), thereby estimating the cause event.

Thus, in the narrowing process, when the degree W of involvement in the cause event with respect to the observation events based on the attribute classification does not converge (S162, NO), the attribute classification is changed. Therefore, the degree W of involvement, which is newly calculated, is caused to converge. Accordingly, as the number of times for the observation is increased, the convergence of the degree W of involvement with respect to a certain observation event is increased (for example, H1 in FIG. 27). Consequently, the O&M system 100 can narrows down the observation events based on the attribute classification, which is the subject to be observed.

<Display Example of Monitor Screen>

Lastly, an example of screen display regarding the observation events and coping method will be described. FIGS. 30 to 34 are diagrams illustrating the examples of such a screen display.

FIG. 30 illustrates the example of the display screen in a case where the extracted observation data is displayed on the monitor 186. As illustrated in FIG. 30, the date and time when the observation event is observed at the base station is displayed for every observation event. The base station can measure the date and time when the observation event is observed, along with the observation event, and the base station can transmit the observation event and the date and time to the O&M system 100. The observation event receiving process unit 111 can obtain the observation event in time series, or can perform the process of putting the received observation event in the order of time series.

Figure 31:
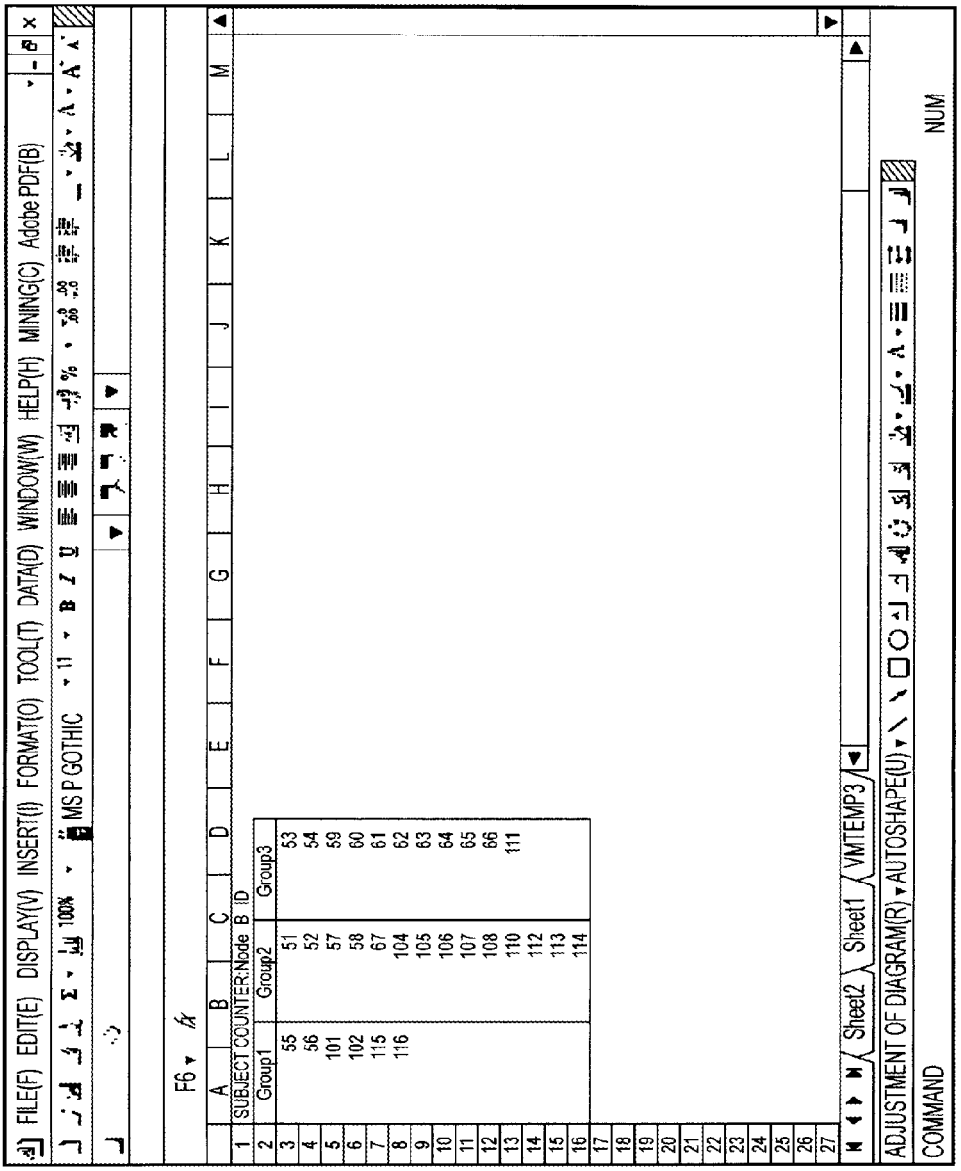
FIG. 31 is a diagram illustrating an example of the screen display for count value of the observation event included in each group.

FIG. 31 illustrates the example of the screen display representing count value of the observation event included in each group for the grouped observation event. FIG. 31 illustrates the example in which the observation event observed at a certain base station is grouped into three group. For example, each group 1 to 3 represents the observation event based on the same attribute classification.

In addition, in the example of the screen display in FIG. 31, for example, the count value of the observation event included in each of the groups is represented in time series. Alternatively, for example, the count value of the observation event observed at an adjacent cell (or base station) at the same time is represented. The O&M system 100 can grasp the number of times for the observation with respect to the observation event included in each of the groups, based on the count value, for example.

Figure 32:
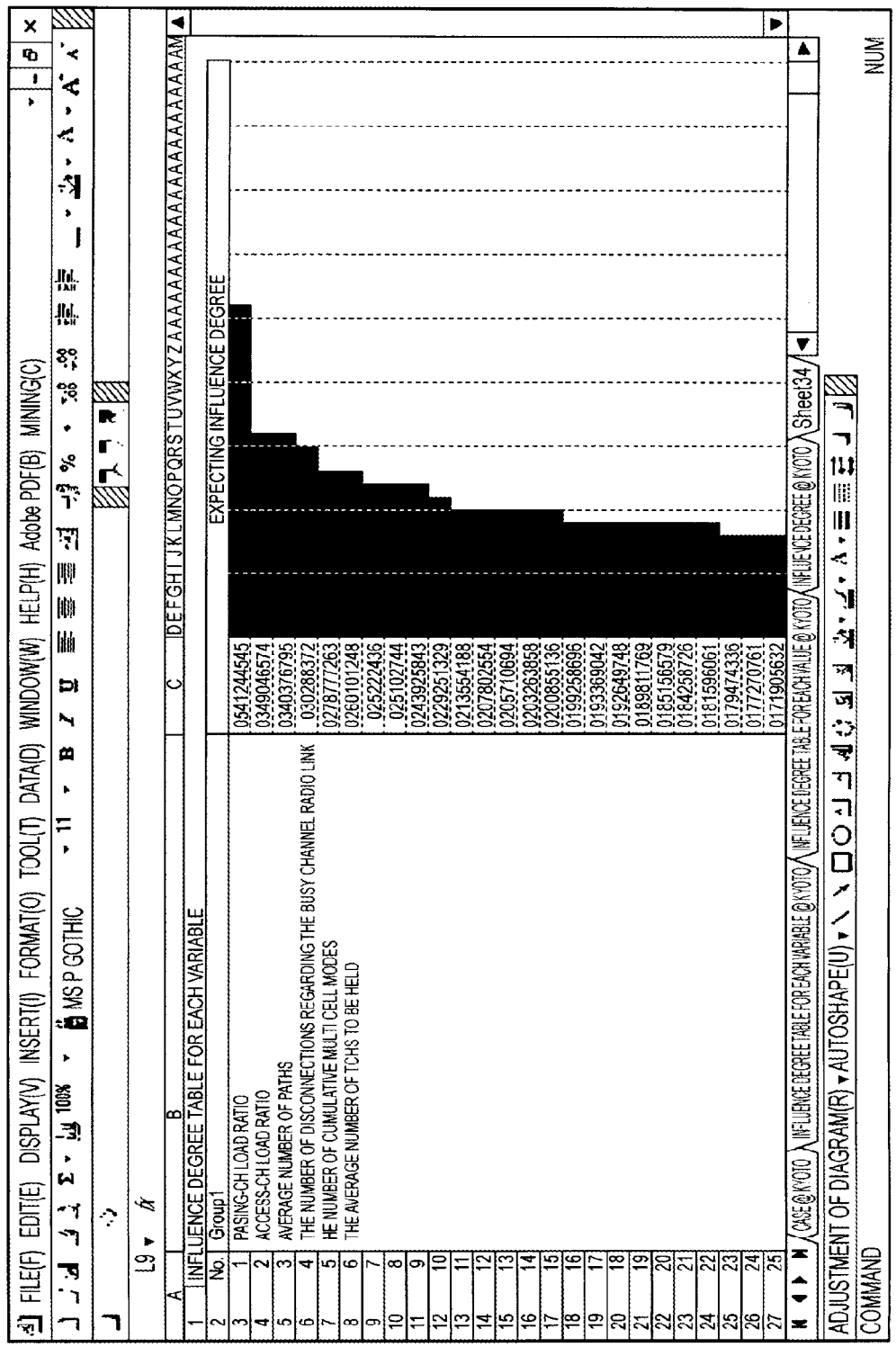
FIG. 32 is a diagram illustrating an example of the screen display for the degree of involvement in the cause event in a graphic form.

FIG. 32 illustrates the example of the screen display representing the degree of involvement in the cause event in a graphic format. For example, FIG. 32 corresponds to FIG. 27. The degree W (new) of involvement that is calculated at a certain timing in the knowledge registering process unit 142 (for example, S161 of FIG. 28) is illustrated in a graph. For example, FIG. 32 represents a state where the degree W of involvement in each cause event is illustrated in the line graph. According to this screen display, the operator, and so on can recognize what value the degree W of involvement in the cause event is, or compare the present cause event with other cause event.

Figure 33:
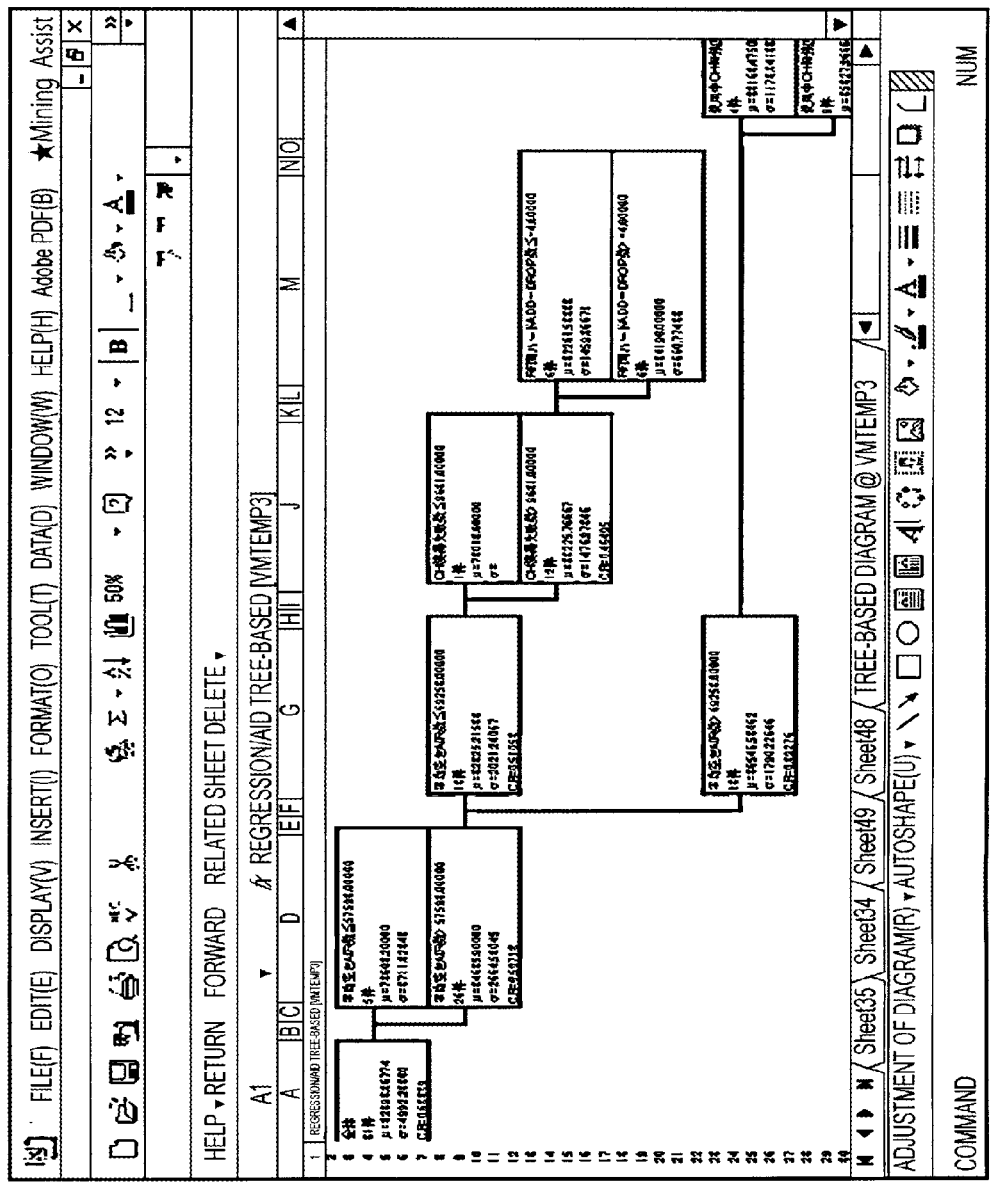
FIG. 33 is a diagram illustrating an example of the screen display for the degree of involvement in a tree-based form.

FIG. 33 illustrates the example of the screen display representing the degree of involvement in a tree-based form (tree form). For example, FIG. 33 illustrates the example of the screen display in a case where the relation of the plurality of cause events is represented in the tree-based form or the relation of the cause event estimated at a certain timing (or circle) and the cause event estimated prior to the certain timing is represented in the tree-based form when the O&M system 100 estimates the plurality of cause events. For example, this tree-based form is stored in the knowledge DB 140. For example, the O&M system 100 can notify the operator of the relation of the cause event by the screen display via monitor 186.

Figure 34:
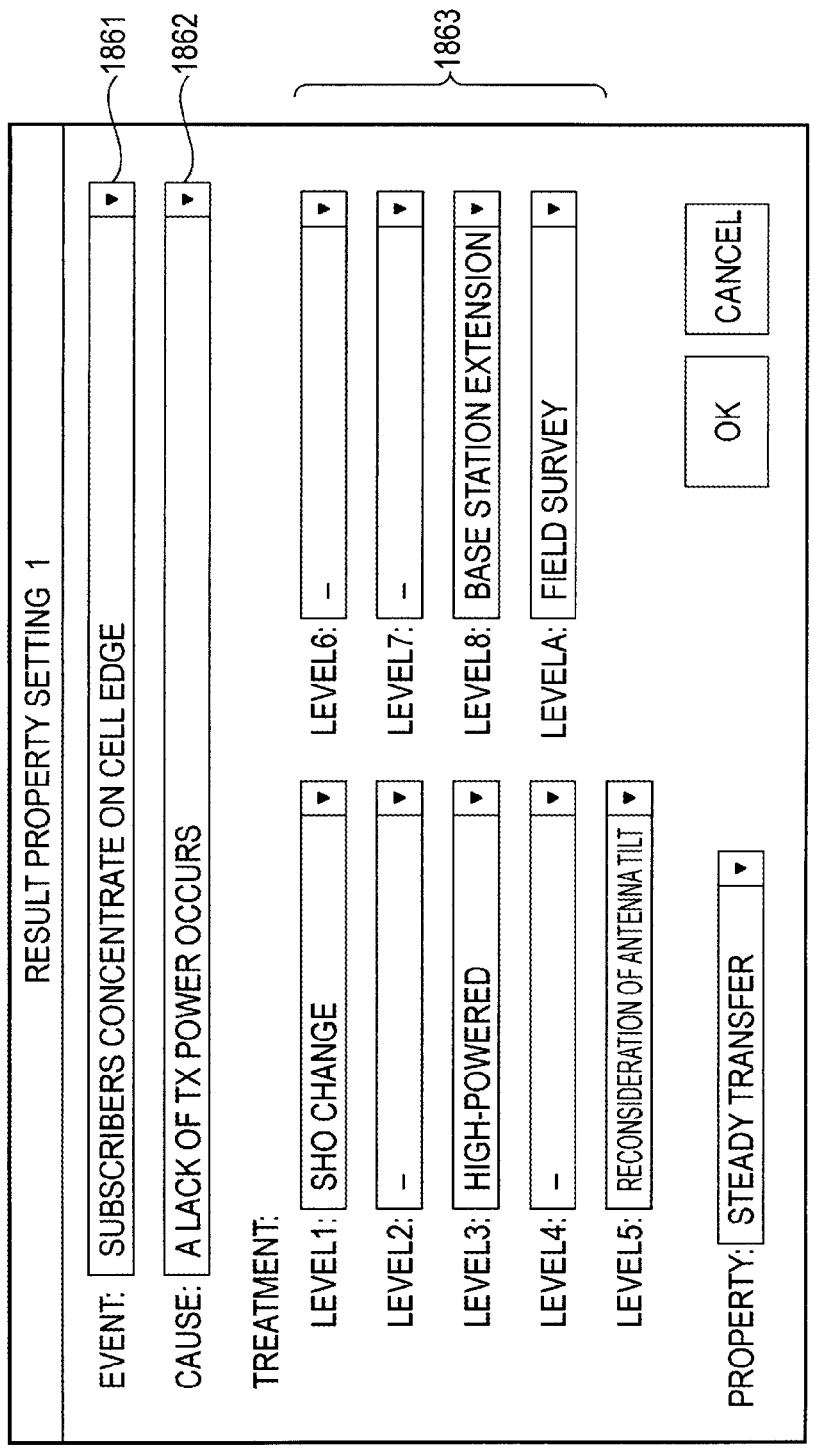
FIG. 34 is a diagram illustrating an example of the screen display on which the cause event and coping method to the cause event are displayed.

FIG. 34 illustrates the example of the screen display representing the cause event and coping methods corresponding to the cause event. For example, FIG. 34 illustrates the example of the screen display displayed on the monitor 186 of the O&M system 100 or a monitor of another apparatus via the operator-or-external-output-apparatus interface unit 169 (FIG. 25).

As illustrated in FIG. 34, the observation event and the corresponding cause event are respectively displayed in item columns 1861 and 1862 on the screen. Further, the coping method corresponding to the cause event is displayed in the item column 1863. For example, "level 1" is displayed as the most probable cause event, and "level 8" is displayed as the least probable cause event. As described in FIG. 34, for example, the number of coping methods may be plural or single.

These coping methods are stored in the knowledge DB 140, for example. For example, the O&M system 100 reads out the coping method corresponding to the estimated cause event, thereby displaying the coping method along with the estimated cause event on the monitor 186.

For example, the cause event is displayed based on the screen display illustrated in FIG. 34, which allows the O&M system 100 to appropriately notify the operator or surveillant of the change or displacement in terms of operational state. Further, for example, the coping method is displayed based on such a screen display described above, so that the O&M system 100 can support the operator or the surveillant in decision-making.

Other Embodiments

Next, other embodiments will be described.

Figure 35:
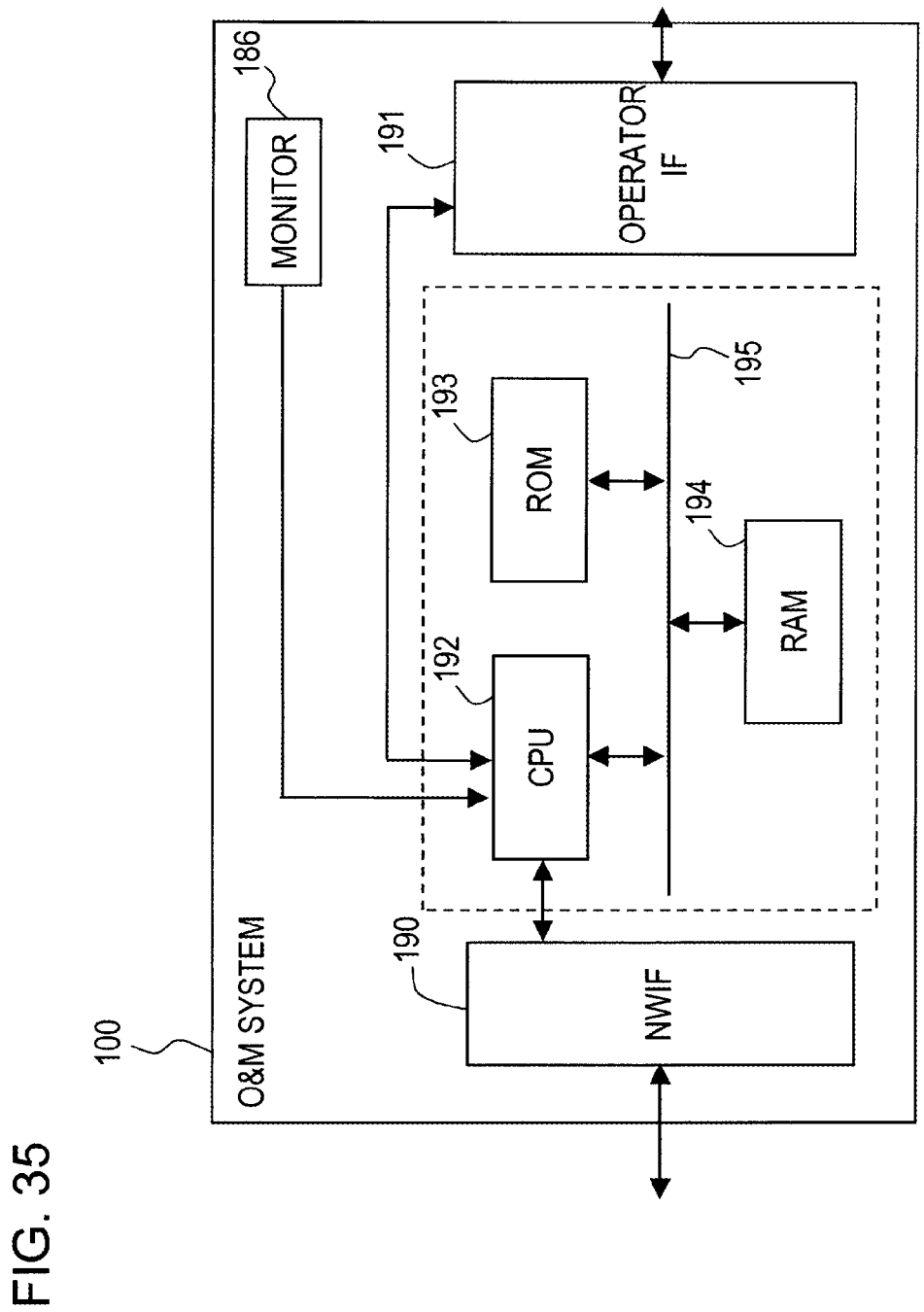
FIG. 35 is a diagram illustrating an example of another configuration of the O&M system.

FIG. 35 is a diagram illustrating an example of another configuration of the O&M system. The O&M system includes the monitor 186, an NWIF 190, an operator IF 191, a Central Processing Unit (CPU) 192, a Random Access Memory (ROM) 193, and a Read-only Memory (RAM) 194. The CPU 192, the ROM 193, and the RAM 194 are connected with each other via a bus 195.

The NWIF 190 corresponds to the NWIF process unit 110 in the second embodiment (for example, FIG. 3), for example. The operator IF 191 corresponds to the operator IF process unit 150 in the second embodiment, for example. The CPU 192 corresponds to the observation event process unit 120 and the cause event determining unit 130 in the second embodiment, for example. Further, the RAM 194 corresponds to the knowledge DB 140 in the second embodiment, for example.

The CPU 192 corresponds to the observation event extracting unit 121, the observation event analyzing process unit 122, the cause event determining process unit 131, the knowledge addition/correction process unit 141, the knowledge registering process unit 142, the associated information receiving process unit 160, the statistical analysis process unit 180, the cope history process unit 182, and the display editing unit 184, in the second embodiment (for example, FIG. 4), for example.

Further, the CPU 192 corresponds to the operation environment analyzing process unit 163, the knowledge information reception process unit 152, the cause communication process unit 133, and the operation history analyzing process unit 172, in the second embodiment (for example, FIGS. 24 and 25), for example.

Further, the RAM 194 corresponds to the observation event DB 113, the process subject observation event DB 127, the change state event DB 128, the state event change cause DB 134, the notice log DB 135, the knowledge information DB 153, the operation information DB 162, the operation environment condition DB 164, the extract observation event DB (t−1 time part) 165, the extract observation event DB (t-time part) 167, the operation history DB 171, and the history analyzing DB 173, in the second embodiment, for example.

The CPU 192 reads out a program stored in the ROM 193 via the bus 193, loads the program in the RAM 194, and executes the loaded program, which achieves the function of each of the corresponding process units described above. At that time, the CPU 192 accesses the RAM 194 to store data, so that the data can be stored in and read out from the DBs including the knowledge DB 140.

According to an aspect of the embodiments, the operation monitoring apparatus, the cause event estimating method for the operation monitoring apparatus, and the information communication network system can be provided in which the cause event can be estimated or determined from a huge mass of observation events.

According to another aspect of the embodiments, the operation monitoring apparatus, the cause event estimating method for the operation monitoring apparatus, and the information communication network system can be provided in which the change or displacement of operational states in the information communication network system can appropriately be notified to the operator or the surveillant.

Further, according to another aspect of the embodiments, the operation monitoring apparatus, the cause event estimating method for the operation monitoring apparatus, and the information communication network system can be provided in which the decision-making can be supported for the operator or the surveillant.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An operation monitoring apparatus for estimating a cause by which a first and second observation data observed by a monitored apparatus are obtained, the operation monitoring apparatus comprising:
   an observation event receiving process unit which receives the first and second observation data transmitted from the monitored apparatus;
   an observation event extracting unit which extracts the first observation data, out of the first and second observation data, based on a first probability that the cause occurs with respect to the first and second observation data at time t−1, and a second probability that the cause occurs with respect to the first and second observation data at time t;
   a cause event determining process unit which estimates the cause based on the extracted first observation data; and
   a cause notifying process unit which outputs data indicating the estimated cause.

2. The operation monitoring apparatus according to claim 1, wherein
   the observation event extracting unit extracts the first observation data when the second probability is higher than the first probability, and
   the observation event extracting unit changes attribute classification to which the first observation data belongs, and extracts the first observation data based on a third probability that the cause occurs with respect to the changed attribute classification, when the second probability is not higher than the first probability.

3. The operation monitoring apparatus according to claim 2, wherein
   the observation event extracting unit calculates the third probability that the cause occurs with respect to other attribute classification overlapping with the attribute classification to which the first observation data belongs, when the second probability is not higher than the first probability, and
   the observation event extracting unit changes the attribute classification to which the first observation data belongs, to the other attribute classification, when the calculated third probability is higher than the second probability.

4. The operation monitoring apparatus according to claim 1, wherein
   the cause notifying process unit outputs data indicating a coping method corresponding to the estimated cause.

5. The operation monitoring apparatus according to claim 4, wherein
   the cause event determining process unit outputs data indicating the different coping method in accordance with the value of the first observation data received by the observation event receiving process unit.

6. The operation monitoring apparatus according to claim 1, wherein
   the observation event extracting unit inputs operation associated information including event information regarding an event and cell information regarding a radio base station apparatus, and extracts the first observation data based on the operation associated information.

7. The operation monitoring apparatus according to claim 1, further comprising a memory stores data indicating the cause with respect to the first observation data, wherein
   the cause event determining process unit reads out the data indicating the cause with respect to the extracted first observation data from the memory and estimate the cause.

8. The operation monitoring apparatus according to claim 7, wherein
   the memory includes a table in which data indicating one or a plurality of causes in accordance with value of the first observation data is stored, and
   the cause event determining process unit reads out from the table the data indicating the cause in accordance with the value of the first observation data received by the observation event receiving process unit.

9. The operation monitoring apparatus according to claim 1, further comprising:
   a memory; and
   a cause analyzing process unit stores in the memory data indicating the estimated cause and data indicating coping method performed by an operator with respect to the estimated cause, wherein
   the cause notifying process unit reads out from the memory the data indicating the coping method corresponding to the cause and outputs the data indicating the coping method, when the cause event determining process unit estimates the cause.

10. The operation monitoring apparatus according to claim 1, wherein
    the first observation data is data of one or a plurality of observation data belonging to a first attribute classification, and the second observation data is data of one or a plurality of observation data belonging to a second attribute classification.

11. The operation monitoring apparatus according to claim 1, wherein
    probability that the cause occurs with respect to the first and second observation data includes a first conditional probability indicating a conditional probability of the cause with respect to the first observation data and a second conditional probability indicating the conditional probability of the cause with respect to the second observation data.

12. An estimating method of cause event in an operation monitoring apparatus for estimating cause by which a first and second observation data observed by a monitored apparatus are obtained, the method comprising:
    receiving the first and second observation data transmitted from the monitored apparatus, by an observation event reception process unit;
    extracting the first observation data, out of the first and second observation data, based on a first probability that the cause occurs with respect to the first and second observation data at time t−1, and a second probability that the cause occurs with respect to the first and second observation data at time t, by an observation event extracting unit;
    estimating the cause based on the extracted first observation data, by a cause event determining process unit; and
    outputting data indicating the estimated cause, by a cause notifying process unit.

13. An information communication network system comprising:
    a monitored apparatus; and
    an operation monitoring apparatus which estimate cause by which a first and second observation data observed by the monitored apparatus are obtained, wherein
    the operation monitoring apparatus including:
    an observation event receiving process unit receives the first and second observation data transmitted from the monitored apparatus;
    an observation event extracting unit which extracts the first observation data, out of the first and second observation data, based on a first probability that the cause occurs with respect to the first and second observation data at time t−1, and a second probability that the cause occurs with respect to the first and second observation data at time t;
a cause event determining process unit which estimates the cause based on the extracted first observation data; and
a cause notifying process unit which outputs data indicating the estimated cause.

* * * * *